US012794523B2

(12) United States Patent
Ly et al.

(10) Patent No.: US 12,794,523 B2
(45) **Date of Patent: *Nov. 10, 2026**

(54) UPLINK SPATIAL FILTER AND PRECODER FOR JOINT CHANNEL ESTIMATION ACROSS PHYSICAL UPLINK SHARED CHANNELS

(71) Applicant: QUALCOMM Incorporated, San Diego, CA (US)

(72) Inventors: Hung Dinh Ly, San Diego, CA (US); Gokul Sridharan, Sunnyvale, CA (US); Wei Yang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 293 days.

This patent is subject to a terminal disclaimer.

(21) Appl. No.: 18/422,700

(22) Filed: Jan. 25, 2024

(65) Prior Publication Data

US 2024/0162951 A1 May 16, 2024

Related U.S. Application Data

(63) Continuation of application No. 17/450,448, filed on Oct. 8, 2021, now Pat. No. 11,901,982.

(60) Provisional application No. 63/090,083, filed on Oct. 9, 2020.

(51) Int. Cl.

| | |
|---|---|
| ***H04B 7/0456*** | (2017.01) |
| ***H04B 7/06*** | (2006.01) |
| ***H04L 5/00*** | (2006.01) |
| ***H04W 72/1268*** | (2023.01) |

(52) U.S. Cl.

CPC ......... *H04B 7/0486* (2013.01); *H04B 7/0639* (2013.01); *H04L 5/0051* (2013.01); *H04W 72/1268* (2013.01)

(58) Field of Classification Search

None

See application file for complete search history.

(56) References Cited

U.S. PATENT DOCUMENTS

| | | | | |
|---|---|---|---|---|
| 11,901,982 | B2 * | 2/2024 | Ly | H04B 7/0486 |
| 2017/0318487 | A1 | 11/2017 | Yamamoto et al. | |
| 2021/0067950 | A1 | 3/2021 | Hosseini et al. | |
| 2021/0226680 | A1 | 7/2021 | Khoshnevisan et al. | |

(Continued)

OTHER PUBLICATIONS

Ericsson: "On Definition of Phase Continuity", 3GPP TSG-RAN WG4 Meeting # 100-e, Electronic Meeting, Aug. 16-27, 2021, R4-2114331, 2 Pages, Agenda item: 9.18.1.

*Primary Examiner* — Willie J Daniel, Jr.

(74) *Attorney, Agent, or Firm* — Arent Fox LLP/Qualcomm Incorporated

(57) ABSTRACT

A base station performs joint channel estimation for a set of physical uplink shared channels (PUSCHs) with bundled DMRS from a user equipment (UE). The UE receives an indication to transmit the set of PUSCHs, each PUSCH of the set of PUSCHs comprising a corresponding DMRS from the base station. The base station transmits, and the UE receives, a sounding reference signal resource indicator for each PUSCH of the set of PUSCHs. The UE transmits the PUSCHs based on a same sounding reference single resource, the SRI for a first PUSCH of the set of PUSCHs indicating the same SRS resource.

30 Claims, 16 Drawing Sheets

(56) References Cited

U.S. PATENT DOCUMENTS

| | | | |
|---|---|---|---|
| 2021/0337534 | A1 | 10/2021 | Xiong et al. |
| 2022/0095330 | A1 | 3/2022 | Kang et al. |
| 2022/0116082 | A1 | 4/2022 | Ly et al. |
| 2022/0353698 | A1 | 11/2022 | Jang et al. |
| 2022/0393744 | A1 | 12/2022 | Karjalainen et al. |
| 2023/0076139 | A1 | 3/2023 | Muruganathan et al. |
| 2023/0125953 | A1 | 4/2023 | Hurd et al. |

* cited by examiner

800

832

812

822

| TPMI index | $W$ (ordered from left to right in increasing order of TPMI index) | | | | | | | |
|---|---|---|---|---|---|---|---|---|
| 0 – 7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8 – 15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ |
| 16 – 23 | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ |
| 24 – 27 | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ | - | - | - | - |

FIG. 8

UPLINK SPATIAL FILTER AND PRECODER FOR JOINT CHANNEL ESTIMATION ACROSS PHYSICAL UPLINK SHARED CHANNELS

CROSS REFERENCE TO RELATED APPLICATION(S)

This application is a continuation of U.S. application Ser. No. 17/450,448, entitled "UPLINK SPATIAL FILTER AND PRECODER FOR PHYSICAL UPLINK SHARED CHANNEL DEMODULATION REFERENCE SIGNAL BUNDLING" and filed on Oct. 8, 2021, which claims the benefit of U.S. Provisional Application Ser. No. 63/090,083, entitled "UPLINK SPATIAL FILTER AND PRECODER FOR PHYSICAL UPLINK SHARED CHANNEL DEMODULATION REFERENCE SIGNAL BUNDLING" and filed on Oct. 9, 2020, which are expressly incorporated by reference herein in their entirety.

BACKGROUND

Technical Field

The present disclosure relates generally to communication systems, and more particularly, to a wireless communication system utilizing DMRS across one or more PUSCHs for joint channel estimation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The UE may receive, from a base station, an indication to transmit a set of physical uplink shared channels (PUSCHs) with phase continuity across the set of PUSCHs; receive, from the base station, for each PUSCH of the set of PUSCHs, a sounding reference signal (SRS) resource indicator (SRI); and transmit, to the base station, the set of PUSCHs with phase continuity across the set of PUSCHs, each PUSCH of the set of PUSCHs being transmitted based on a same SRS resource, the SRI for a first PUSCH of the set of PUSCHs indicating the same SRS resource.

In some aspects, the SRI for each PUSCH of the set of PUSCHs indicates the same SRS resource, and wherein each PUSCH of the set of PUSCHs is transmitted based on its respective SRI.

In some aspects, the SRI for a second PUSCH of the set of PUSCHs indicates a different SRS resource than the same SRS resource, and wherein the second PUSCH is transmitted based on the same SRS resource.

In some aspects, the UE may transmit the set of PUSCHs based on non-codebook transmission.

In some aspects, the UE may receive, from the base station, for each PUSCH of the set of PUSCHs, a transmission rank indicator (TRI) and a transmit precoder matrix indicator (TPMI), wherein each PUSCH of the set of PUSCHs is transmitted based on its respective TRI and TPMI, wherein each TRI indicates a same rank, and wherein each TPMI indicates a same transmit precoder matrix.

In some aspects, the at least one processor transmits the set of PUSCHs based on codebook transmission.

In some aspects, the UE may receive, from the base station, a TRI and a TPMI for a third PUSCH from the base station, the TRI for the third PUSCH indicating a different rank than the same rank or the TPMI for the third PUSCH indicating a different transmit precoder matrix than the same transmit precoder matrix, wherein the set of PUSCHs does not comprise the third PUSCH, and wherein the indication is to transmit the third PUSCH and the set of PUSCHs; and transmit, to the base station, the third PUSCH based on the different rank or the different transmit precoder matrix, wherein a DMRS of the third PUSCH is not included in the DMRSs of PUSCHs in the set of PUSCHs.

In some aspects, the UE may receive, from the base station, for each PUSCH of the set of PUSCHs, a transmission rank indicator (TRI) and a transmit precoder matrix indicator (TPMI), wherein each PUSCH of the set of PUSCHs is transmitted based on its respective TRI and TPMI, wherein each TRI indicates a same rank, and wherein transmit precoder matrices indicated by each TPMI of the TPMIs have a same mapping between antenna port and transmission layer.

In some aspects, the UE may receive, from the base station, for each PUSCH of the set of PUSCHs, a transmission rank indicator (TRI) and a transmit precoder matrix indicator (TPMI), wherein: the TRI for the first PUSCH indicates a first transmission rank, the TPMI for the first PUSCH indicates a first transmit precoder matrix, the TRI for a second PUSCH indicates a second transmission rank different from the first transmission rank or the TPMI for the second PUSCH indicates a second transmit precoder matrix different from the first transmit precoder matrix, and the second PUSCH is transmitted based on the first transmission rank and the first transmit precoder matrix.

In some aspects, the second transmit precoder matrix has a different mapping between antenna port and transmission layer than the first precoder matrix.

In some aspects, each SRI for the set of PUSCHs corresponds to a same SRS resource transmission occasion.

In some aspects, the UE may receive, from the base station, a SRI for a third PUSCH from the base station, the SRI for the third PUSCH indicating a different SRS resource than the same SRS resource, wherein the set of PUSCHs does not comprise the third PUSCH, and wherein the indication is to transmit the third PUSCH and the set of PUSCHs; and transmit, to the base station, the third PUSCH based on the different SRS resource, wherein a DMRS of the third PUSCH is not included in the DMRSs of PUSCHs in the set of PUSCHs.

In another aspect of the disclosure, a method, a computer-readable medium, and an apparatus are provided. The apparatus may be a base station. The base station may transmit, to a user equipment (UE), an indication to transmit a set of physical uplink shared channels (PUSCHs), each PUSCH comprising a demodulation reference signal (DMRS); transmit, to the UE, for each PUSCH of the set of PUSCHs, a sounding reference signal (SRS) resource indicator (SRI); and receive, from the UE, the set of PUSCHs, each PUSCH comprising the corresponding DMRS, the set of PUSCHs having phase continuity, each PUSCH of the set of PUSCHs being received based on a same SRS resource, the SRI for a first PUSCH of the set of PUSCHs indicating the same SRS resource.

In some aspects, the base station may perform joint channel estimation for the set of PUSCHs based on the DMRS comprised in the set of PUSCHs.

In some aspects, the SRI for each PUSCH of the set of PUSCHs indicates the same SRS resource, and wherein each PUSCH of the set of PUSCHs is received based on its respective SRI.

In some aspects, the SRI for a second PUSCH of the set of PUSCHs indicates a different SRS resource than the same SRS resource, and wherein the second PUSCH is received based on the same SRS resource.

In some aspects, the base station may receive the set of PUSCHs based on non-codebook transmission.

In some aspects, the base station may transmit, to the UE, for each PUSCH of the set of PUSCHs, a transmission rank indicator (TRI) and a transmit precoder matrix indicator (TPMI), wherein each PUSCH of the set of PUSCHs is received based on its respective TRI and TPMI, wherein each TRI indicates a same rank, and wherein each TPMI indicates a same transmit precoder matrix.

In some aspects, the base station may receive the set of PUSCHs based on codebook transmission.

In some aspects, the base station may transmit, to the UE, a TRI and a TPMI for a third PUSCH, the TRI for the third PUSCH indicating a different rank than the same rank or the TPMI for the third PUSCH indicating a different transmit precoder matrix than the same transmit precoder matrix, wherein the set of PUSCHs does not comprise the third PUSCH, and wherein the indication is to transmit the third PUSCH and the set of PUSCHs; receive, from the UE, the third PUSCH based on the different rank or the different transmit precoder matrix, wherein a DMRS of the third PUSCH is not included in the DMRS of PUSCHs in the set of PUSCHs; and perform a channel estimation for the third PUSCH based on the DMRS of the third PUSCH.

In some aspects, the base station may transmit, to the UE, for each PUSCH of the set of PUSCHs, a transmission rank indicator (TRI) and a transmit precoder matrix indicator (TPMI), wherein each PUSCH of the set of PUSCHs is received based on its respective TRI and TPMI, wherein each TRI indicates a same rank, and wherein transmit precoder matrices indicated by each TPMI of the TPMIs have a same mapping between antenna port and transmission layer.

In some aspects, the base station may transmit, to the UE, for each PUSCH of the set of PUSCHs, a transmission rank indicator (TRI) and a transmit precoder matrix indicator (TPMI), wherein: the TRI for the first PUSCH indicates a first transmission rank, the TPMI for the first PUSCH indicates a first transmit precoder matrix, the TRI for a second PUSCH indicates a second transmission rank different from the first transmission rank or the TPMI for the second PUSCH indicates a second transmit precoder matrix different from the first transmit precoder matrix, and the second PUSCH is received based on the first transmission rank and the first transmit precoder matrix.

In some aspects, the second transmit precoder matrix has a different mapping between antenna port and transmission layer than the first precoder matrix.

In some aspects, each SRI for the set of PUSCHs corresponds to a same SRS resource transmission occasion.

In some aspects, the base station may transmit, to the UE, a SRI for a third PUSCH, the SRI for the third PUSCH indicating a different SRS resource than the same SRS resource, wherein the set of PUSCHs does not comprise the third PUSCH, and wherein the indication is to transmit the third PUSCH and the set of PUSCHs; receive, from the UE, the third PUSCH based on the different SRS resource, wherein a DMRS of the third PUSCH is not included in the DMRS of PUSCHs in the set of PUSCHs; and perform a channel estimation for the third PUSCH based on the DMRS of the third PUSCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 illustrates an example table of TPMIs and corresponding transmit precoder matrices.

DETAILED DESCRIPTION

Figure 1:
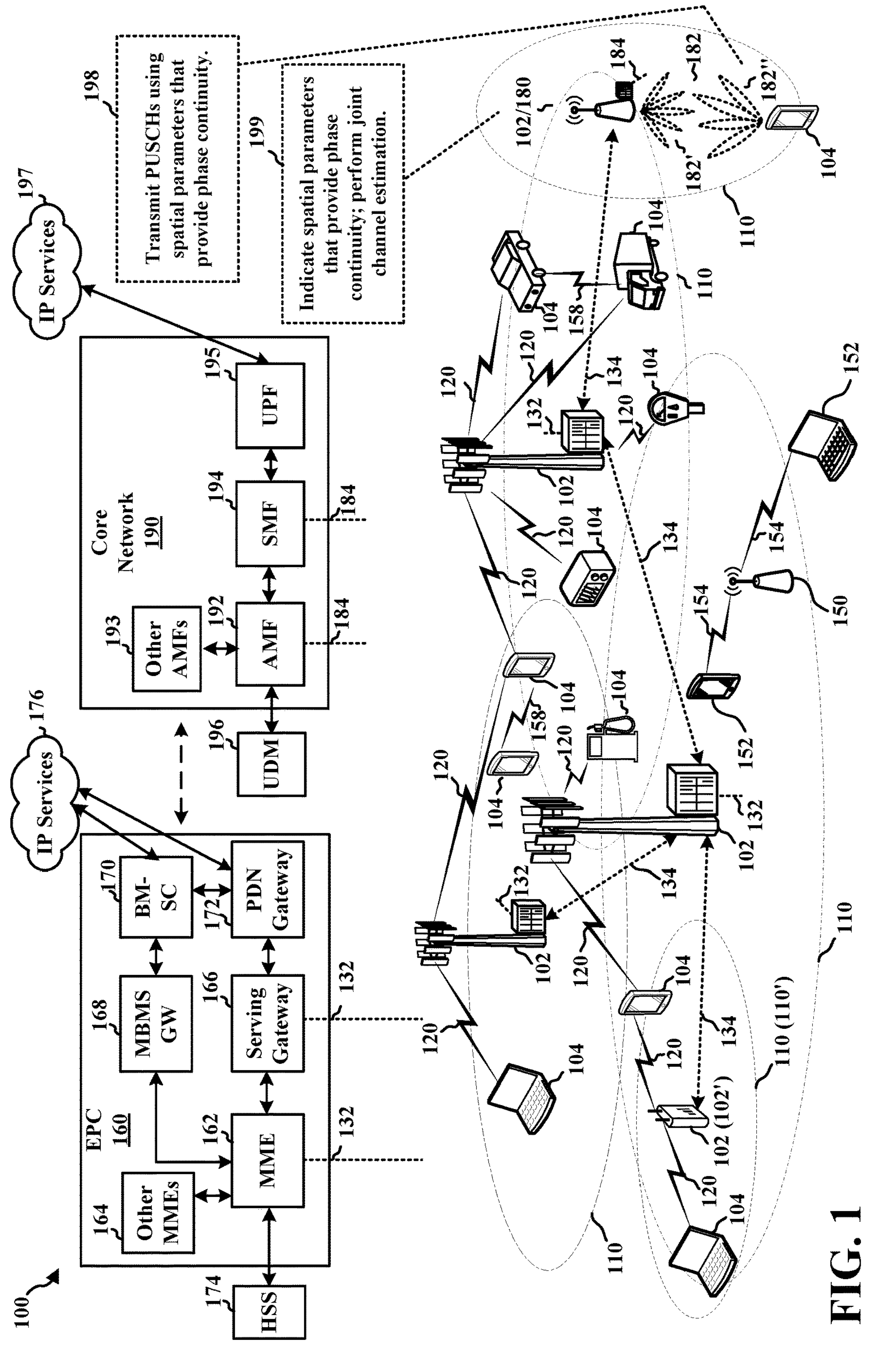
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182''. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management.

All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to transmit PUSCHs to the base station 180 using spatial parameters that provide phase continuity for the DMRS of the PUSCHs (198). In certain aspects, the base station 180 may be configured to indicate spatial parameters to the UE 104 that provide phase continuity for the DMRS of the PUSCHs, and to perform joint channel estimation for the PUSCHs (199). Although the following description may be focused on 5G NR, the concepts described herein may be applicable to other similar areas, such as LTE, LTE-A, CDMA, GSM, and other wireless technologies.

Figure 2A:
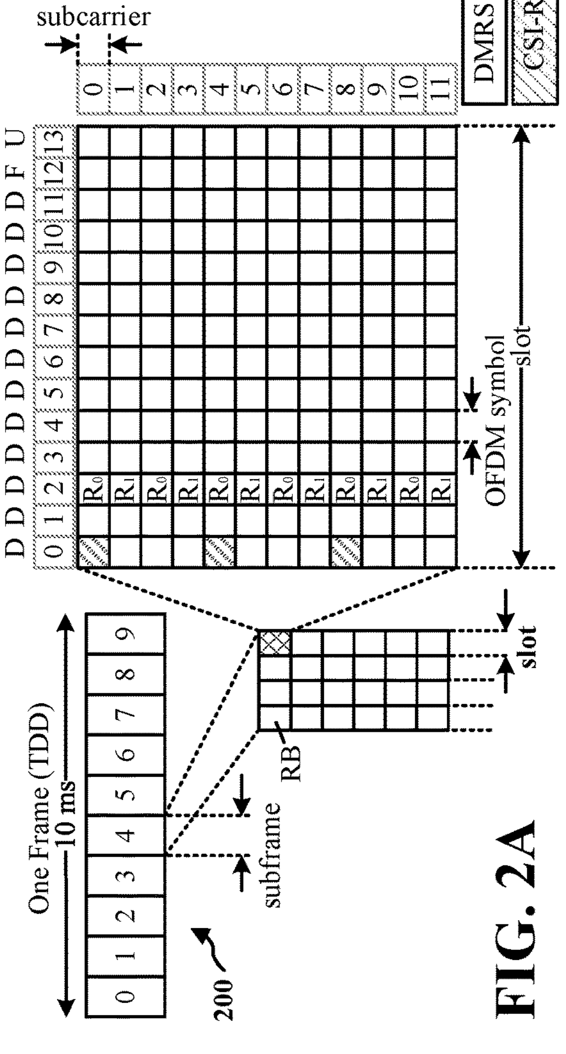
FIGS. 2A, 2B, 2C, and 2D are diagrams illustrating examples of a first 5G NR frame, DL channels within a 5G NR subframe, a second 5G NR frame, and UL channels within a 5G NR subframe, respectively.
Figure 2B:
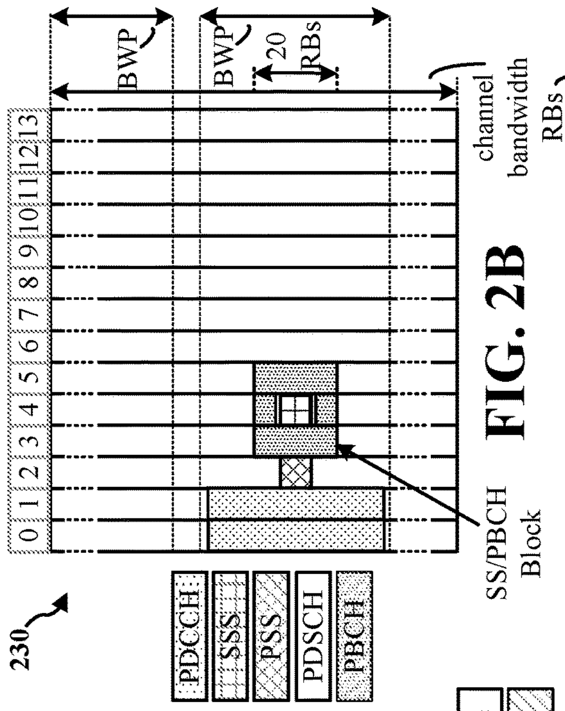
Figure 2C:
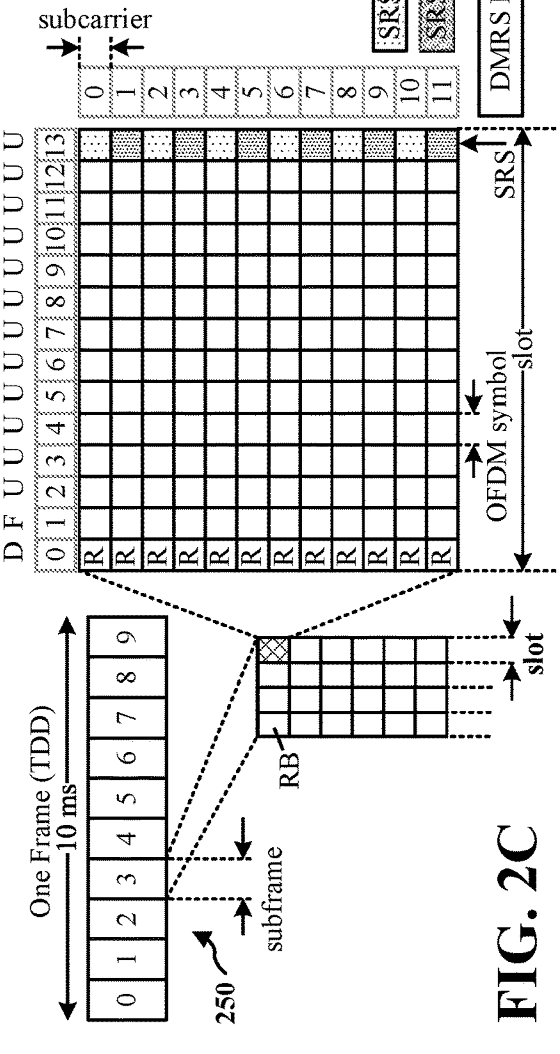
Figure 2D:
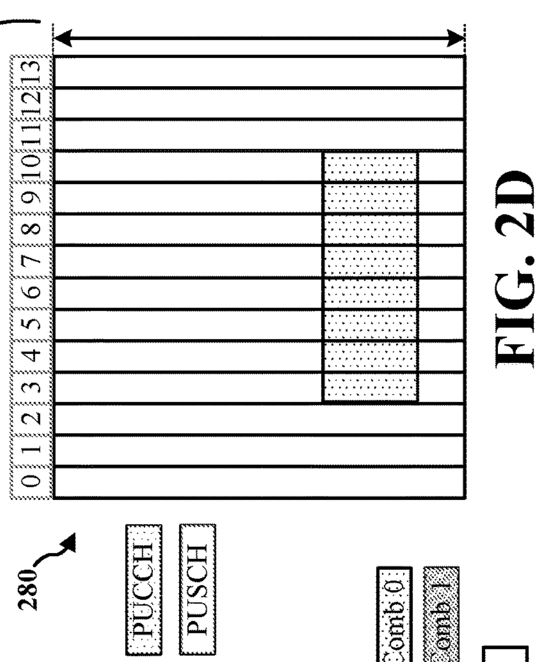

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^{\mu}$ slots/subframe. The subcarrier spacing and symbol length/duration are a function of the numerology. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
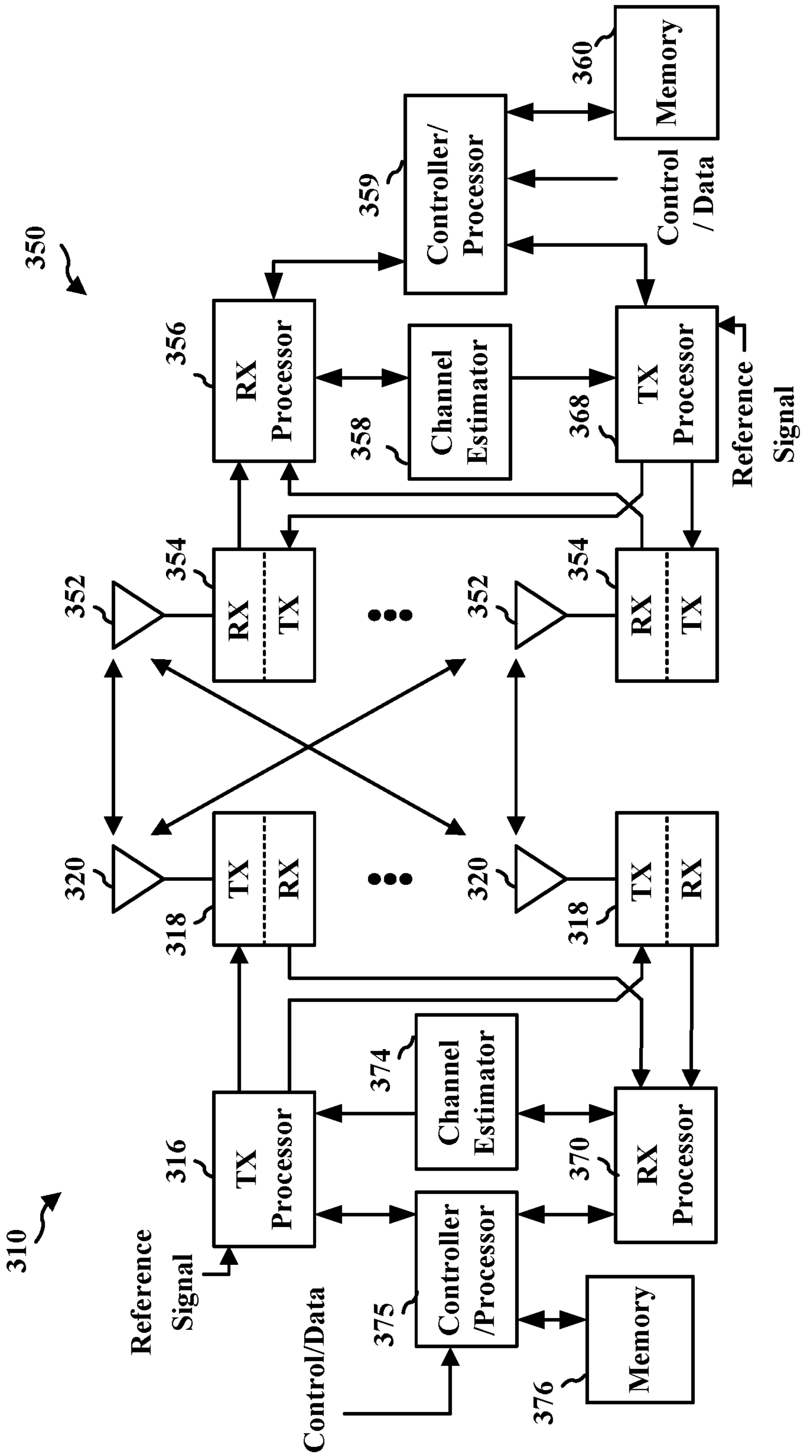
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Figure 4:
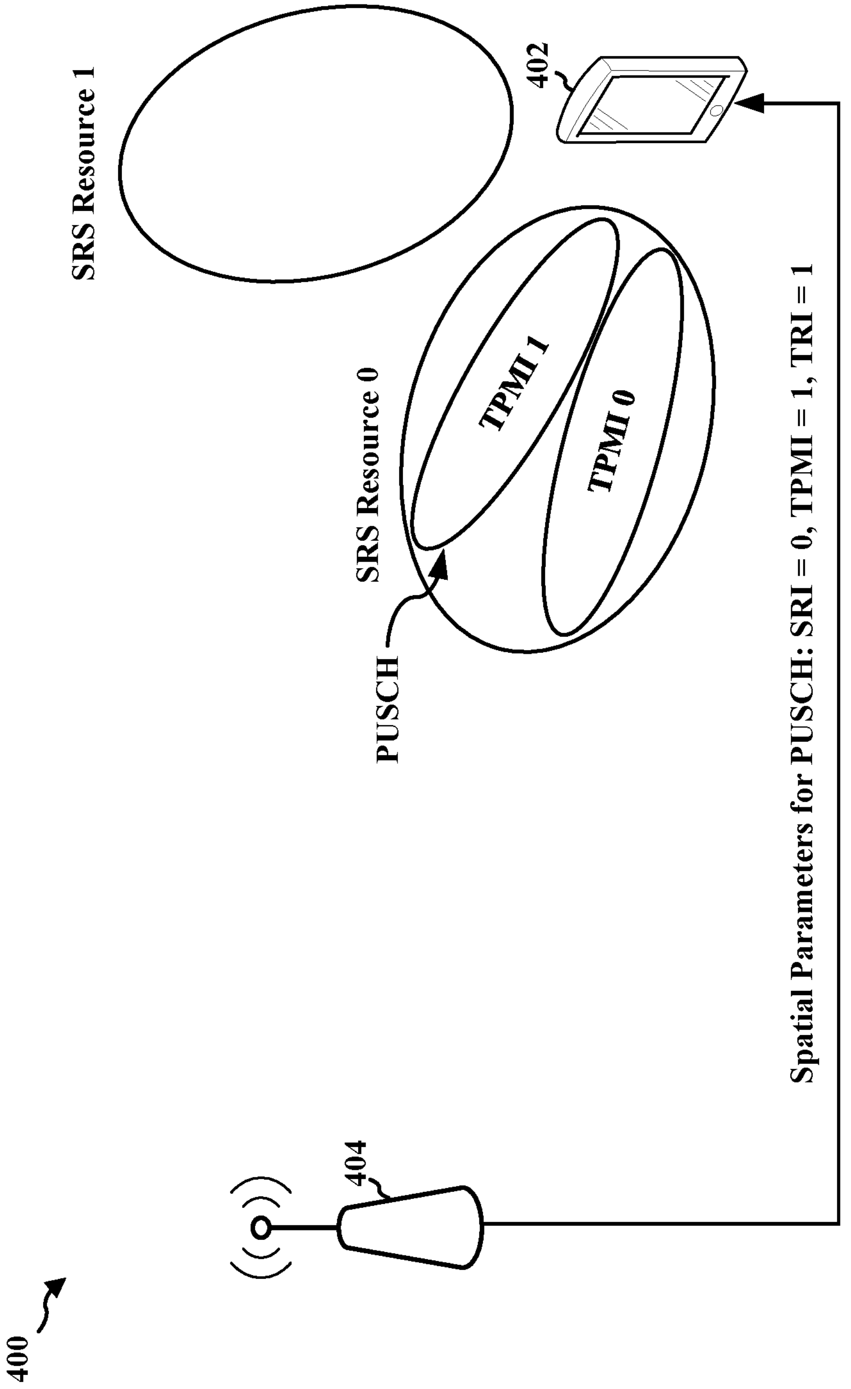
FIG. 4 is a diagram illustrating uplink spatial filter and precoder selection in codebook based communication.

FIG. 4 is a diagram 400 illustrating uplink spatial filter and precoder selection in codebook based communication. A base station 404 schedules a UE 402 to transmit a PUSCH to the base station 404.

The UE 402 may transmit SRS on SRSs resources. For example, the UE 402 may transmit SRS on one or two SRS resources. Each SRS resource may correspond to a spatial filter or a panel of the UE 402. A SRS resource may have one, two, or four ports. The base station 404 may receive the SRS transmitted on the SRS resource and may determine spatial parameters for the UE 402 to use for a PUSCH based on the received SRS. For example, the spatial parameters may be an antenna port (e.g., the antenna port corresponding to a particular SRS resource), a transmit precoder matrix, and a transmission rank for the PUSCH. The base station 404 may transmit an indication of the determined spatial parameters to the UE 402. For example, the base station 404 may transmit a SRS resource indicator (SRI), a transmit precoder matrix indicator (TPMI), and a transmission rank indicator (TRI) to the UE 402. In some aspects, for codebook based transmissions, an SRI may be an index value identifying a single SRS resource. The base station 404 may transmit the indication of the determined spatial parameters to the UE 402 in DCI. The UE 402 may receive the indication of the determined spatial parameters and may transmit the PUSCH to the base station 404 using the indicated spatial parameters.

As illustrated in FIG. 4, the UE 402 may transmit SRS on SRS resource 0 and SRS resource 1. The base station 404 may determine that a PUSCH from the UE 402 should be transmitted by the UE 402 on SRS resource 0, using transmit precoder matrix 1, with a transmission rank of 1. The base station 404 may transmit a SRI of 0, a TPMI of 1, and a TRI of 1 to the UE 402 with respect to the PUSCH to indicate that the PUSCH should be transmitted on SRS resource 0, using transmit precoder matrix 1, with a transmission rank of 1. The UE 402 may transmit the PUSCH to the base station 404 accordingly.

Figure 5:
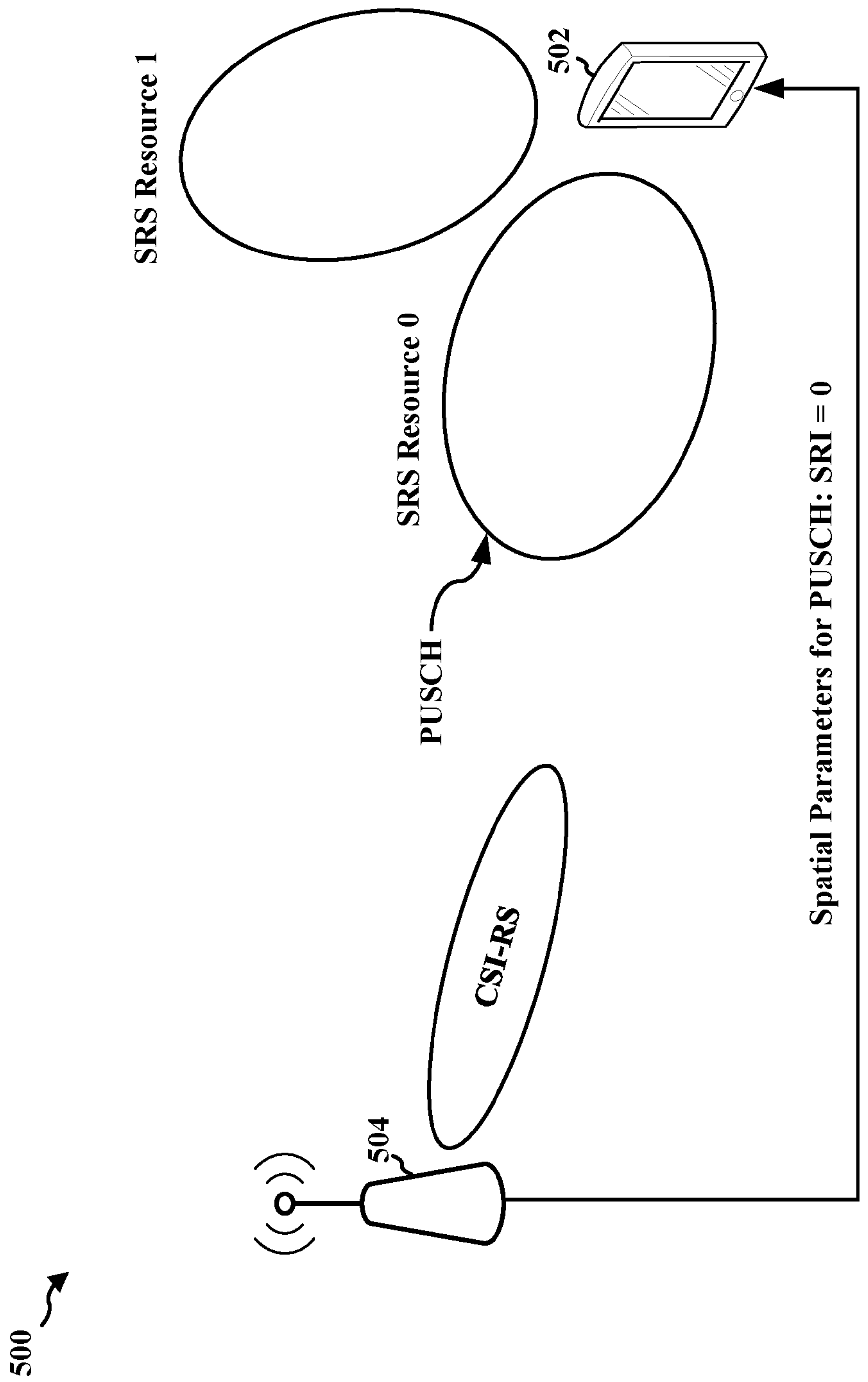
FIG. 5 is a diagram illustrating uplink spatial filter selection in non-codebook based communication.

FIG. 5 is a diagram 500 illustrating uplink spatial filter selection in non-codebook based communication. A base station 504 schedules a UE 502 to transmit a PUSCH to the base station 504.

The base station 504 may transmit one or more CSI-RS (e.g., non-zero-power CSI-RS). The UE 502 may receive the CSI-RS and may determine a precoder for an SRS transmission based on the CSI-RS. The UE 502 may transmit SRS on SRS resources using the determined precoder. Each SRS resource may correspond to one antenna port, and may correspond to a PUSCH layer.

The base station 504 may receive the SRS, and may determine an SRS resource or a combination of SRS resources for the PUSCH based on the SRS. The UE may transmit the PUSCH on the same antenna port or ports as used to transmit the determined SRS resource or resources. The base station 504 may transmit an indication of the determined SRS resource or resources to the UE 502. For example, the base station 504 may transmit one or more SRIs to the UE 502 indicating the determined SRS resources for the PUSCH. In some aspects, for non-codebook-based transmissions, the SRI may be an index value identifying a single SRS resource of a combination of SRS resources (e.g., index 1 identifies only SRS resource 1, index 4 identifies the combination of SRS resource 0 and SRS resource 2).

The UE 502 may receive the indication of the determined SRS resource or resources and may transmit the PUSCH to the base station 504 based on the indicated SRS resource or SRS resources. The UE 502 may determine a PUSCH precoder and transmission rank based on the determined SRS resource or resources (e.g., based on a received SRI). The UE 502 may determine an antenna port or antenna ports that were used to transmit the determined SRS resource or resources, and may use those antenna ports to transmit the PUSCH.

As illustrated in FIG. 5, the UE 502 may transmit SRS on SRS resource 0 and SRS resource 1. The base station 504 may determine that a PUSCH from the UE 502 should be transmitted by the UE 502 on SRS resource 0. The base station 504 may transmit a SRI of 0, identifying SRS resource 0 (e.g., not in combination with another SRS resource). The UE 502 may receive the SRI and may transmit the PUSCH to the base station 504 on the antenna port used to transmit SRS resource 0.

In some aspects, a UE may maintain phase continuity across a set of PUSCHs so that a base station may perform joint channel estimation based on DMRSs in PUSCHs in the set. In some aspects, a PUSCH comprising a corresponding DMRS may comprise a DMRS that is bundled with a PUSCH. In some aspects, a set of PUSCHs, where one or more PUSCHs of the set of PUSCHs or each PUSCH of the set of PUSCHs comprises a corresponding DMRS, may comprise bundled DMRS. In joint channel estimation, a base station may utilize the DMRSs in one or more PUSCHs in a set of PUSCHs to determine a channel estimate for demodulating that set of PUSCHs. The channel estimation for a given PUSCH is based not just on the DMRS contained in that PUSCH, but also on the DMRS of other PUSCH of the set. In some aspects, joint channel estimation may be referred to as cross-slot channel estimation and the base station may determine a channel estimate for multiple slots based on DMRS received in multiple slots. In some aspects, the UE may maintain phase continuity across a set of transmissions by storing the phase at the end of a previous transmission and adjusting the phase at the beginning of a next transmission, if needed, until the phase at the beginning of the next transmission matches the phase at the end of the previous transmission.

When transmitting a set of transmissions, such as PUSCHs, where one or more transmissions of the set of transmissions comprise a DMRS (e.g., a corresponding DMRS), the UE may maintain phase continuity across the set of transmissions (e.g., a set of PUSCHs) and transmit the set of transmissions with phase continuity. Phase continuity may refer to the phase of the transmitted waveforms varying consistently and continuously across the transmissions. This may be referred to as the transmissions having phase continuity. The phase at the beginning of one transmission waveform may be assumed as continuing from the phase at the end of the immediately preceding transmission waveform. Without phase continuity, the base station may not be able to utilize the DMRS in one or more transmissions of the set of transmissions to perform joint channel estimation. If the transmissions containing the DMRS have discontinuity in the phases of their waveforms, joint combination of the DMRS transmissions at the base station may be destructive instead of constructive. Furthermore, DMRS transmissions may have different unknown phase values. Hence, jointly processing DMRS across the multiple transmissions to estimate the channel may not be possible.

Phase discontinuity between transmissions may occur where the phase of one transmission does not continue into the next transmission. Phase discontinuity may be caused by changes in the phase of the gain applied to transmission waveforms by the power amplifier. For example, where PUSCH slots are transmitted on non-contiguous time resources, the power amplifier may be turned off between the transmissions; when the power amplifier is turned on for the second transmission, the phase may be random, and may not be continuous from the previous transmission. PUSCH slots transmitted on different frequency resources, with different transmit power, or with different timing advances may also have phase discontinuity. Phase discontinuity may occur where a different antenna port or spatial filter is used for different transmissions. When a transmission uses a different antenna port or spatial filter, a power amplifier may be driven differently or a different power amplifier may be used.

For codebook based transmissions (e.g., as described with respect to FIG. 4), transmissions based on different SRIs may be transmitted on different antenna panels which may result in phase discontinuity. Transmissions based on different ranks may use different antenna ports and/or may apply different levels of power to antenna ports which may result in phase discontinuity. Transmissions based on different transmit precoder matrices may map to different antenna ports which may result in phase discontinuity. For non-codebook-based transmissions (e.g., as described with respect to FIG. 5), transmissions based on different SRIs may be transmitted on different antenna ports or panels which may result in phase discontinuity.

Figure 6:
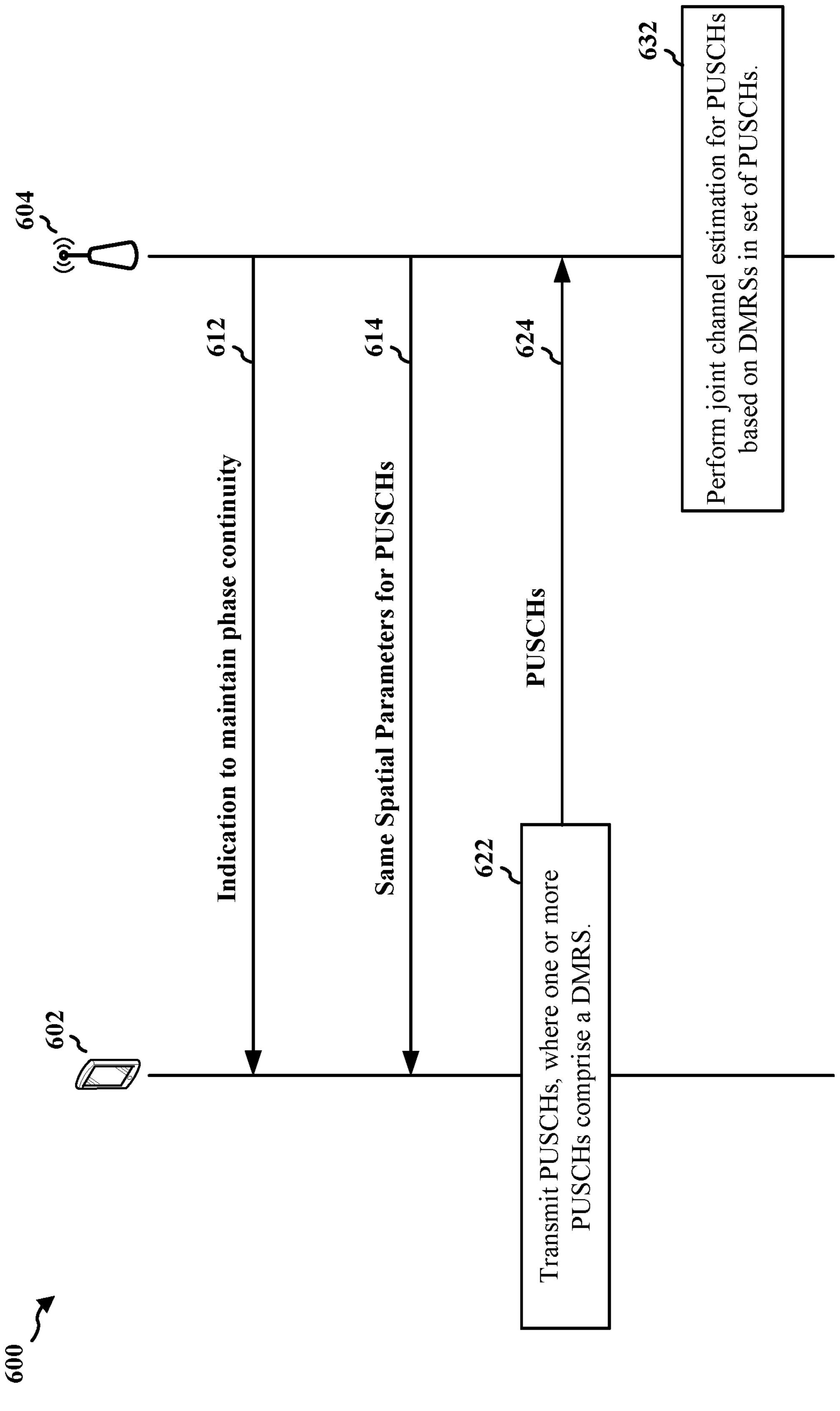
FIG. 6 is a communication flow diagram illustrating use of the same spatial parameters to perform joint channel estimation based on DMRSs in PUSCHs in a set of PUSCHs.

FIG. 6 is a communication flow diagram 600 illustrating use of the same spatial parameters to perform joint channel estimation based on DMRSs in PUSCHs in a set of PUSCHs. A base station 604 may determine to schedule a set of PUSCHs for uplink from a UE 602, and that the base station 604 will perform joint channel estimation for the set of PUSCHs utilizing the DMRSs in one or more PUSCHs in the set of PUSCHs. For example, the base station 604 may perform joint channel estimation for the set PUSCHs utilizing the corresponding DMRS in the one or more PUSCHs in the set of PUSCHs. The base station 604 may transmit an indication 612 to the UE 602 to maintain phase continuity across a set of PUSCHs, and the UE 602 may receive the indication 612. The indication 612 may be included in DCI, such as the DCI scheduling the PUSCHs. In some aspects, the indication 612 may be a single DCI. The single DCI may indicate a number of PUSCHs across which to maintain phase continuity. In some aspects, the indication 612 may include a separate DCI for each PUSCH in the set of PUSCHs across which phase continuity is to be maintained. Each DCI may indicate whether a phase (e.g., a phase at the beginning) for the PUSCH scheduled by that DCI should be maintained with the phase at the end of the previous PUSCH.

The base station 604 may transmit spatial parameters 614 for the set of PUSCHs to the UE 602, and the UE 602 may receive the spatial parameters 614. The base station 604 may generate and send the same spatial parameters 614 for each PUSCH of the set of PUSCHs based on having determined to perform joint channel estimation for the set of PUSCHs. In some aspects, codebook based transmission may be used, the spatial parameters 614 may include a SRI, a TRI, and/or a TPMI for each PUSCH, and each PUSCH may have the same SRI, TRI, and TPMI. In some aspects, non-codebook based transmission may be used, the spatial parameters 614 may include a SRI for each PUSCH, and each PUSCH may have the same SRI.

As illustrated at 622, the UE 602 may transmit the set of PUSCHs 624, where one or more PUSCHs comprise a DMRS. The one or more PUSCHs may comprise a corresponding DMRS. The UE 602 may maintain phase continuity across the set of PUSCHs 624 and transmit the set of PUSCHs with phase continuity The UE 602 may transmit the set of PUSCHs 624 based on the spatial parameters 614 received from the base station 604. In some aspects, codebook based transmission is used. The UE 602 transmits the set of PUSCHs 624 on the same antenna ports with the same precoder matrix and the same rank based on having received the same SRI, TPMI, and TRI for the set of PUSCHs 624. In some aspects, non-codebook based transmission is used. The UE 602 determines the same precoder and rank for transmission of the set of PUSCHs 624 and transmits the set of PUSCHs 624 on the same antenna ports based on having received the same SRI for the set of PUSCHs 624. The UE 602 may transmit the set of PUSCHs 624 with phase continuity, as the UE 602 uses the same precoder matrix, the same rank, and the same antenna ports for the transmissions.

The base station 604 may receive the set of PUSCHs 624. As illustrated at 632, the base station 604 may perform joint channel estimation for the set of PUSCHs 624 based on DMRSs in PUSCHs in the set of PUSCHs 624. The base station 604 may generate a channel estimate based on the DMRSs in one or more PUSCHs in the set of PUSCHs 624. For example, the base station 604 may generate a channel estimate based on the DMRSs of multiple PUSCHs or all of the PUSCHs in the set of PUSCHs 624. The base station 604 may use the channel estimate to decode the set of PUSCHs 624.

Figure 7:
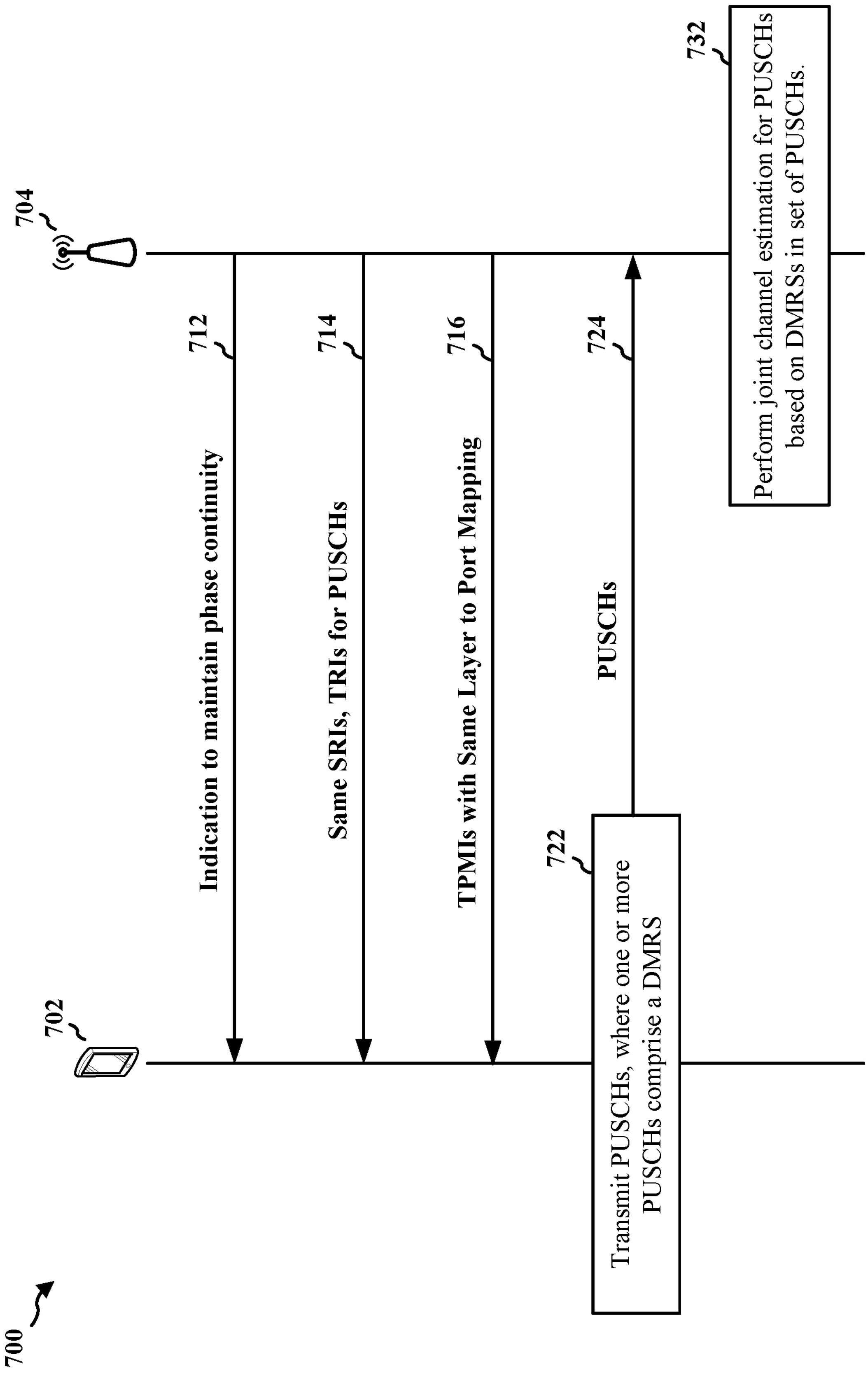
FIG. 7 is a communication flow diagram illustrating use of spatial parameters including TPMIs with the same mapping between antenna port and transmission layer to perform joint channel estimation based on DMRSs in PUSCHs in a set of PUSCHs.

FIG. 7 is a communication flow diagram 700 illustrating use of spatial parameters including TPMIs with the same mapping between antenna port and transmission layer to perform joint channel estimation based on DMRSs in PUSCHs in a set of PUSCHs. A base station 704 may determine to schedule a set of PUSCHs for uplink from a UE 702, and that the base station 704 will perform joint channel estimation for the set of PUSCHs. The base station 704 may receive uplink transmissions from the UE 702 based on codebook based transmission. The base station 704 may transmit an indication 712 to the UE 702 to maintain phase continuity across a set of PUSCHs, and the UE 702 may receive the indication 712. For example, the indication 712 may be the same as described above with respect to the indication 612 of FIG. 6. The base station 704 may transmit SRIs and TRIs 714 for the set of PUSCHs to the UE 702, and the UE 702 may receive the SRIs and TRIs 714. The base station 704 may generate and send the same SRI and TRI for each PUSCH of the set of PUSCHs based on having determined to perform joint channel estimation for the set of PUSCHs.

The base station 704 may transmit TPMIs 716 for the set of PUSCHs to the UE 702, and the UE 702 may receive the TPMIs 716. The base station 704 may generate and send TPMIs 716 corresponding to transmit precoder matrices with the same transmission layer to antenna port mapping for each PUSCH of the set of PUSCHs based on having determined to perform joint channel estimation for the set of PUSCHs. For example, FIG. 8 illustrates an example table 800 of TPMIs and corresponding transmit precoder matrices. The transmit precoder matrices of FIG. 8 are for mapping a single layer transmission to four antenna ports. The transmit precoder matrices corresponding to TPMIs 4-7, highlighted with box 812, all map the single layer to the first and third antenna ports. The transmit precoder matrices corresponding to TPMIs 12-27, illustrated with box 822, all map the single layer to the first, second, third, and fourth antenna ports. The transmit precoder matrix corresponding to TPMI 3, illustrated with box 832, maps the single layer to the fourth antenna port.

When using the example TPMI table of FIG. 8, to generate and send TPMIs 716 corresponding to transmit precoder matrices with the same transmission layer to antenna port mapping for each PUSCH of the set of PUSCHs, the base station 704 may assign the PUSCHs with the same or different TPMIs selected from the set of TPMIs 4-7, but may not assign any PUSCH of the set of PUSCHs with a TPMI of 0-3 or 8-27. Similarly, the base station 704 may assign the PUSCHs with the same or different TPMIs selected from the set of TPMIs 12-27, but may not assign any PUSCH of the set of PUSCHs with a TPMI of 0-11. If the base station 704 assigns a PUSCH of the set of PUSCHs with a TPMI of 3, all PUSCHs of the set of PUSCHs may be assigned with a TPMI of 3, as TPMI 3 corresponds to the only transmit precoder matrix in the table that maps the single layer to only the fourth antenna port.

Referring again to FIG. 7, as illustrated at 722, the UE 702 may transmit the set of PUSCHs 724, where one or more PUSCHs in the set of PUSCHs comprise a DMRS. The UE 702 may transmit the set of PUSCHs 724 based on the SRIs and TRIs 714 received from the base station 704 and the TPMIs 716 received from the base station. The UE 702 may transmit the set of PUSCHs 724 using the same or different transmit precoder matrices based on having received the TPMIs 716. Because the TPMIs 716 have the same transmission layer to antenna port mapping, the UE 702 may transmit the PUSCHs on the same antenna ports with the same power allocation, even if the UE 702 transmits the PUSCHs with different transmit precoder matrices. The UE 702 may transmit the set of PUSCHs 724 with phase continuity, as the UE 702 uses the same rank, the same antenna ports, and compatible transport precoder matrices for the transmissions.

The base station 704 may receive the set of PUSCHs 724. As illustrated at 732, the base station 704 may perform joint channel estimation for the set of PUSCHs 724 based on DMRSs in one or more PUSCHs in the set of PUSCHs 724. The base station 704 may generate a channel estimate based on the DMRSs in one or more PUSCHs in the set of PUSCHs 724. For example, the base station 704 may generate a channel estimate based on the DMRSs of multiple PUSCHs or all of the PUSCHs in the set of PUSCHs 724. The base station 704 may use the channel estimate to decode the set of PUSCHs 724.

Figure 9:
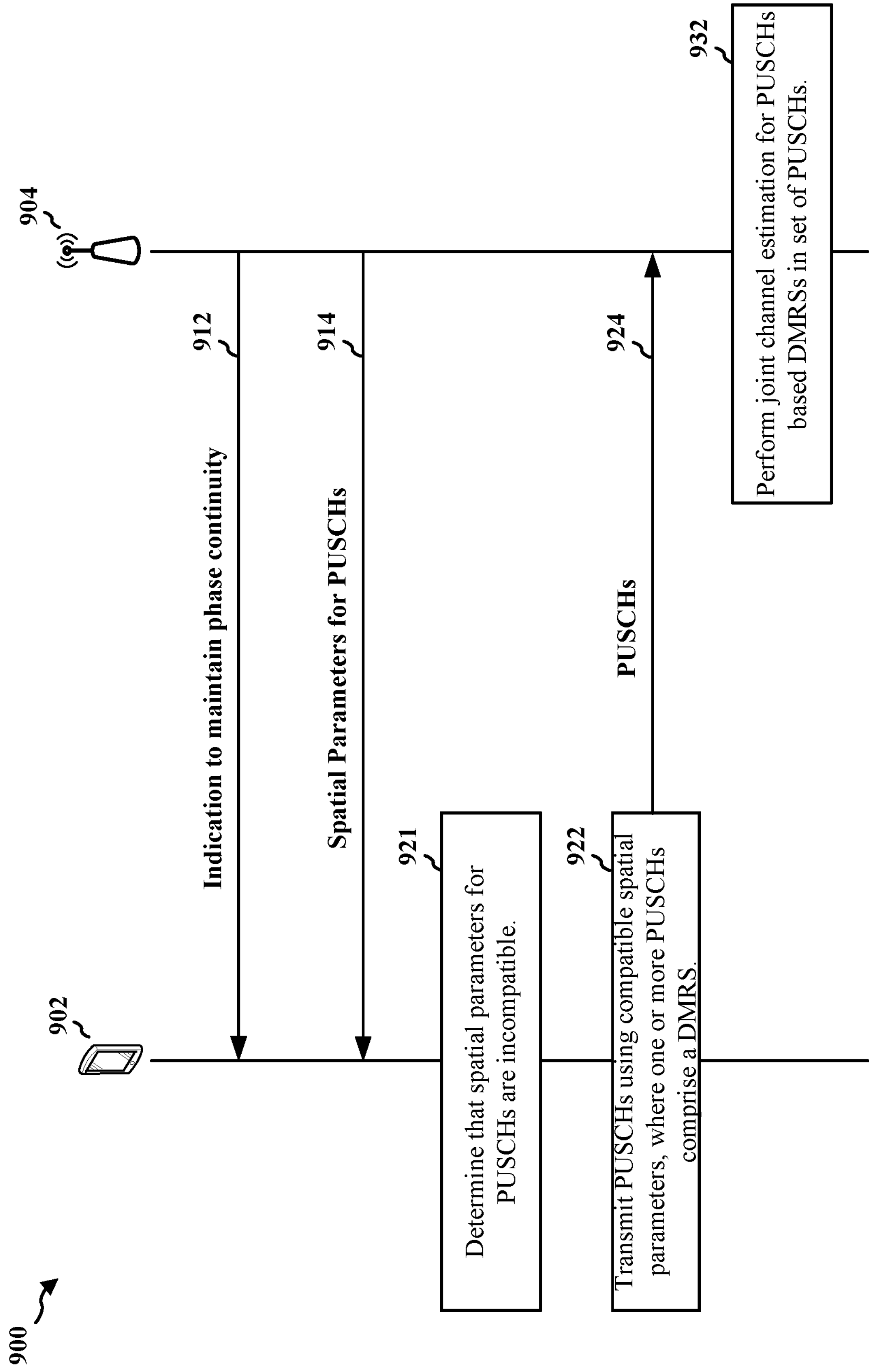
FIG. 9 is a communication flow diagram illustrating use of compatible spatial parameters to perform joint channel estimation based on DMRSs in PUSCHs in a set of PUSCHs with incompatible spatial parameters.

FIG. 9 is a communication flow diagram 900 illustrating use of compatible spatial parameters to perform joint channel estimation based on DMRS in PUSCHs in a set of PUSCHs with incompatible spatial parameters. A base station 904 may determine to schedule a set of PUSCHs for uplink from a UE 902, and that the base station 904 will perform joint channel estimation for the set of PUSCHs. The base station 904 may transmit an indication 912 to the UE 902 to maintain phase continuity across a set of PUSCHs, and the UE 902 may receive the indication 912. For example, the indication 912 may be the same as described above with respect to the indication 612 of FIG. 6.

The base station 904 may transmit spatial parameters 914 for the set of PUSCHs to the UE 902, and the UE 902 may receive the spatial parameters 914. In some aspects, codebook based transmission may be used and the spatial parameters 914 may include a SRI, a TRI, and/or a TPMI for each PUSCH. In some aspects, non-codebook based transmission may be used and the spatial parameters 914 may include a SRI for each PUSCH.

As illustrated at 921, the UE 902 may determine that the spatial parameters 914 received for the set of PUSCHs, which the indication 912 indicated should be transmitted, where one or more PUSCHs in the set of PUSCHs comprise a DMRS are incompatible. Being incompatible may refer to the spatial parameters 914 indicating that the PUSCHs should be transmitted using different transmission spatial filters, which may result in phase discontinuity between the PUSCHs. In some aspects, codebook based transmission may be used and determining that the spatial parameters 914 are incompatible may be determining that the spatial parameters 914 include different SRIs, include different TRIs, or include different TPMIs. In some aspects, codebook based transmission may be used and determining that the spatial parameters 914 are incompatible may be determining that the spatial parameters 914 include different TPMIs that map the transmission layer or transmission layers to different antenna ports. In some aspects, non-codebook transmission may be used and determining that the spatial parameters 914 are incompatible may be determining that the spatial parameters 914 include different SRIs.

As illustrated at 922, the UE 902 may transmit the set of PUSCHs 924, where one or more PUSCHs in the set of PUSCHs comprise a DMRS, using compatible spatial parameters. Being compatible may refer to the spatial parameters resulting in the PUSCHs being transmitted on the same antenna ports and/or with the same power allocations to the antenna ports, which may result in phase continuity between the PUSCHS. In some aspects, codebook based transmission may be used and transmitting the PUSCHs with compatible spatial parameters may include transmitting the PUSCHs based on the same SRI, the same TRI, and the same TPMI. In some aspects, codebook based transmission may be used and transmitting the PUSCHs with compatible spatial parameters may include transmitting the PUSCHs based on TPMIs that map the transmission layer or transmission layers to the same antenna ports. In some aspects, non-codebook transmission may be used and transmitting the PUSCHs with compatible spatial parameters may include transmitting the PUSCHs based on the same SRI.

In some aspects, for the spatial parameter that differs between the PUSCHs, the UE 902 may determine the most common received value for the set of PUSCHs 924 and may use that value for the spatial parameter for all of the PUSCHs of the set of PUSCHs 924. For example, the UE 902 may receive an indication to maintain phase continuity across the set of five PUSCHs from the base station 904. The UE 902 may receive an SRI of zero for the first, second, and fifth PUSCHs and may receive an SRI of one for the third and fourth PUSCHs. The UE 902 may transmit all five PUSCHs, where each PUSCH may comprise a DMRS and where the set of five PUSCHs have phase continuity based on an SRI of zero.

In some aspects, for the spatial parameter that differs between the PUSCHs, the UE 902 may use the first received value for the spatial parameter for all of the PUSCHs of the set of PUSCHs 924. For example, the UE 902 may receive an indication to maintain phase continuity across the set of five PUSCHs from the base station 904. The UE 902 may receive an SRI of zero for the first and second PUSCHs and may receive an SRI of one for the third, fourth, and fifth PUSCHs. The UE 902 may transmit all five PUSCHs based on an SRI of zero, where each PUSCH may comprise a DMRS and where the set of five PUSCHs have phase continuity.

The base station 904 may receive the set of PUSCHs 924. As illustrated at 932, the base station 904 may perform joint channel estimation for the set of PUSCHs 924 based on DMRSs in one or more PUSCHs in the set of PUSCHs 924. The base station 904 may generate a channel estimate based on the DMRSs in one or more PUSCHs in the set of PUSCHs 924. For example, the base station 904 may generate channel based on the DMRSs of multiple PUSCHs or all of the PUSCHs in the set of PUSCHs 924. The base station 904 may use the channel estimate to decode the set of PUSCHs 924.

Figure 10:
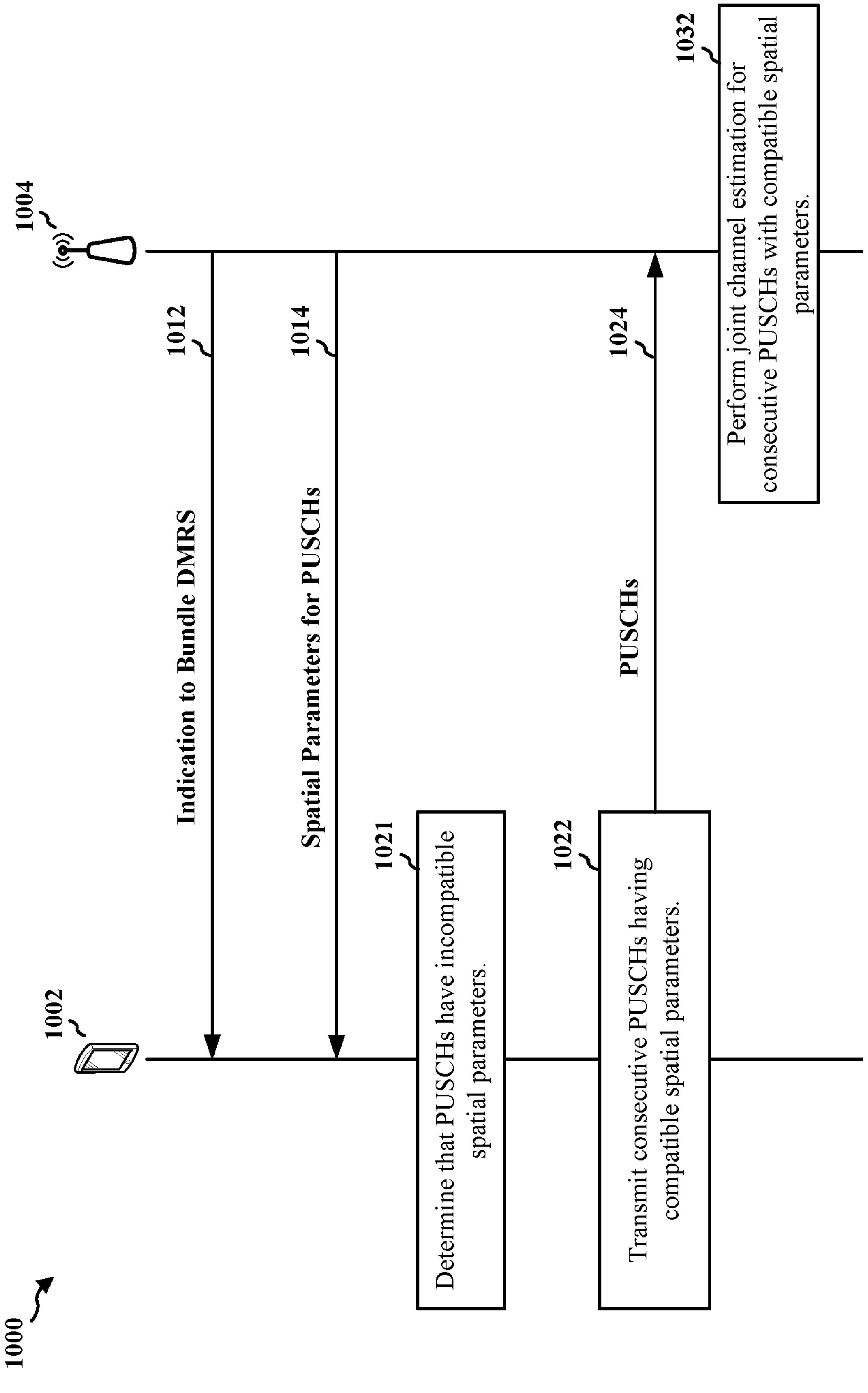
FIG. 10 is a communication flow diagram illustrating transmission of a set of PUSCHs using incompatible spatial parameters, where one or more PUSCHs in the set of PUSCHs comprises a DMRS.

FIG. 10 is a communication flow diagram 1000 illustrating transmission of a set of PUSCHs using incompatible spatial parameters, where each PUSCH in the set of PUSCH comprises a DMRS. A base station 1004 may determine to schedule a set of PUSCHs for uplink from a UE 1002, and that the base station 1004 will perform joint channel estimation for the set of PUSCHs. The base station 1004 may transmit an indication 1012 to the UE 1002 to maintain phase continuity across a set of PUSCHs, and the UE 1002 may receive the indication 1012. For example, the indication 1012 may be the same as described above with respect to the indication 612 of FIG. 6.

The base station 1004 may transmit spatial parameters 1014 for the set of PUSCHs to the UE 1002, and the UE 1002 may receive the spatial parameters 1014. In some aspects, codebook based transmission may be used and the spatial parameters 1014 may include a SRI, a TRI, and/or a TPMI for each PUSCH. In some aspects, non-codebook based transmission may be used and the spatial parameters 1014 may include a SRI for each PUSCH.

As illustrated at 1021, the UE 1002 may determine that the spatial parameters 1014 received for the set of PUSCHs, which the indication 1012 indicated should be transmitted with phase continuity, are incompatible. Being incompatible may refer to the spatial parameters 1014 indicating that the PUSCHs should be transmitted on different antenna ports or with different power allocations to the antenna ports, which may result in phase discontinuity between the PUSCHs. In some aspects, codebook based transmission may be used and determining that the spatial parameters 1014 are incompatible may be determining that the spatial parameters 1014 include different SRIs, include different TRIs, or include different TPMIs. In some aspects, codebook based transmission may be used and determining that the spatial parameters 1014 are incompatible may be determining that the spatial parameters 1014 include different TPMIs that map the transmission layer or transmission layers to different antenna ports. In some aspects, non-codebook transmission may be used and determining that the spatial parameters 1014 are incompatible may be determining that the spatial parameters 1014 include different SRIs.

As illustrated at 1022, the UE 1002 may transmit consecutive PUSCHs of the set of PUSCHs that have compatible spatial parameters, where one or more or each PUSCH of consecutive PUSCHs may comprise a DMRS. Being compatible may refer to the spatial parameters resulting in the PUSCHs being transmitted on the same antenna ports and/or with the same power allocations to the antenna ports, which may result in phase continuity between the PUSCHS. In some aspects, codebook based transmission may be used and the UE 1002 may transmit consecutive PUSCHs with the same SRI, the same TRI, and the same TPMI. In some aspects, codebook based transmission may be used and the UE 1002 may transmit consecutive PUSCHs with TPMIs that map the transmission layer or transmission layers to the same antenna ports, where one or more PUSCHs of the consecutive PUSCHs comprises a DMRS or each PUSCH comprises a DMRS. In some aspects, non-codebook transmission may be used and the UE 1002 may transmit consecutive PUSCHs with the same SRI, where one or more PUSCHs of the consecutive PUSCHs comprises a DMRS or each PUSCH comprises a DMRS. For example, the UE 1002 may receive an indication to maintain phase continuity across the set of five PUSCHs from the base station 1004. The UE 1002 may receive an SRI of zero for the first, second, third, and fifth PUSCHs and may receive an SRI of one for the fourth PUSCH. The UE 1002 may transmit the first, second, and third PUSCHs, where one or more PUSCHs of the first, second, and third PUSCHs comprises a DMRS or each of the first, second, and third PUSCH comprises a DMRS, and the first, second, and the PUSCHs have phase continuity, and may not transmit the fourth and fifth PUSCHs, where one or more PUSCH of the fourth and the fifth PUSCHs comprises a DMRS or each of the fourth, and the fifth PUSCHs comprises a DMRS.

The base station 1004 may receive the set of PUSCHs 1024. As illustrated at 1032, the base station 1004 may perform joint channel estimation for consecutive PUSCHs of the set of PUSCHs 1024 with compatible spatial parameters based on DMRSs in one or more PUSCHs of those PUSCHs. The base station 1004 may use the channel estimate to decode the consecutive PUSCHs with compatible spatial parameters. The base station 1004 may perform a single-PUSCH channel estimation for the other PUSCHs based on the DMRS in those respective PUSCHs. For example, the set of PUSCHs 1024 may include five PUSCHs. The first, second, third, and fifth PUSCHs may have an SRI of zero and the fourth PUSCH may have an SRI of one. The base station 1004 may perform joint channel estimation for the first, second, and third PUSCHs. The base station 1004 may perform a channel estimate for the fourth PUSCH based on the DMRS of the fourth PUSCH and may perform a channel estimate for the fifth PUSCH based on the DMRS of the fifth PUSCH.

Figure 11:
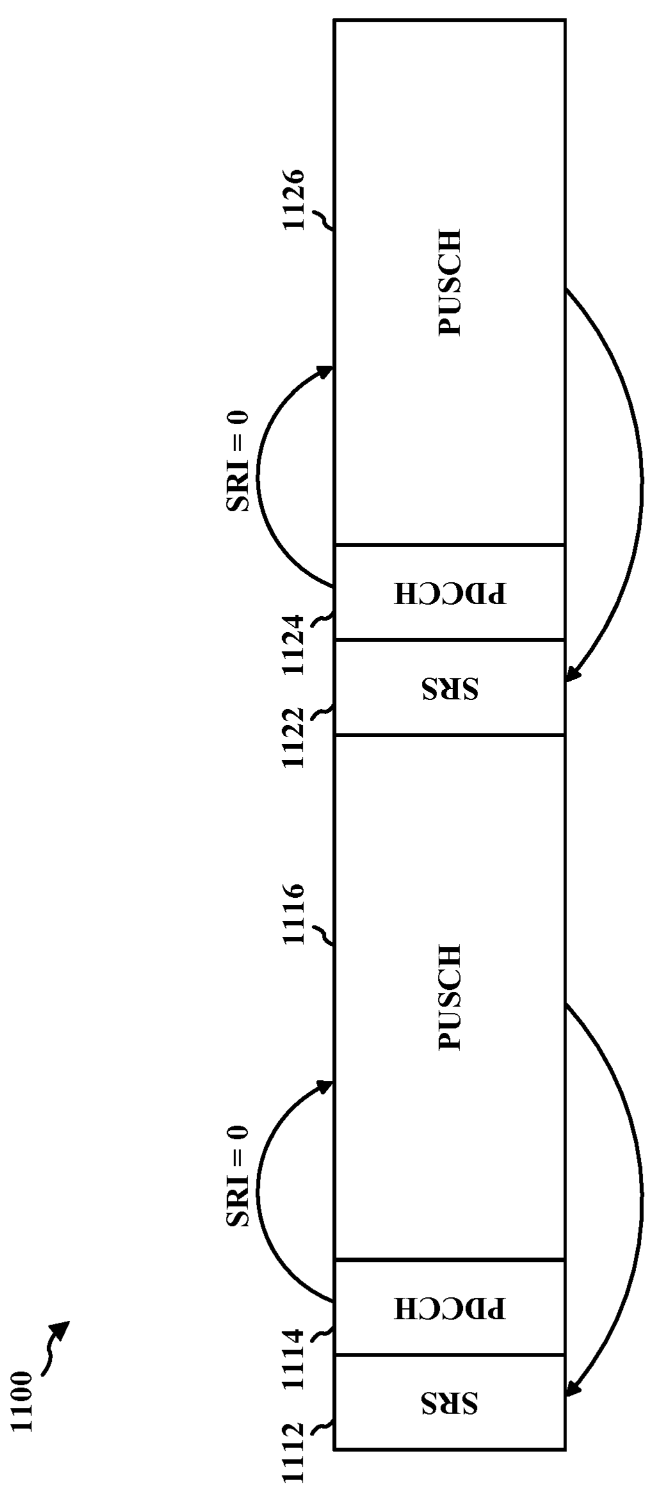
FIG. 11 is a diagram illustrating SRS resource selection for PUSCHs.

FIG. 11 is a diagram 1100 illustrating SRS resource selection for PUSCHs. An SRI for a PUSCH may identify a transmission spatial filter for a PUSCH by identifying the SRS resource that was transmitted by the UE on that transmission spatial filter. In some aspects, a UE may interpret an SRI based on the most recent SRS transmit occasion.

As illustrated in FIG. 11, a UE may transmit SRS resources at a first SRS transmit occasion 1112. The UE may subsequently receive a first PDCCH 1114. The first PDCCH 1114 may include spatial parameters for a first PUSCH (e.g., in DCI), including an SRI. The SRI may have a value of zero, indicating that the UE should transmit the first PUSCH on the transmission spatial filter which the UE used to transmit SRS resource zero. The UE may transmit the first PUSCH 1116. The UE may use the transmission spatial filter used for SRS resource zero at the first SRS transmit occasion 1112 to transmit the first PUSCH 1116.

The UE may transmit SRS resources at a second SRS transmit occasion 1122. The UE may use a different transmission spatial filter for one or more SRS resources than it used at the first SRS transmit occasion 1112. The UE may subsequently receive a second PDCCH 1124. The second PDCCH 1124 may include spatial parameters for a second PUSC, including an SRI. The SRI may have a value of zero, indicating that the UE should transmit the second PUSCH on the transmission spatial filter which the UE transmitted SRS resource zero. The UE may transmit the second PUSCH 1126. The UE may use the transmission spatial filter used for SRS resource zero at the second SRS transmit occasion 1122 to transmit the second PUSCH 1126.

Both the first PUSCH 1116 and the second PUSCH 1126 are transmitted based on an SRI of zero. However, if the UE transmitted SRS resource zero on different transmission spatial filters at the first SRS transmit occasion 1112 and the second SRS transmit occasion 1122, the first PUSCH 1116 and the second PUSCH 1126 may not have phase continuity, even though transmitted based on the same SRI.

Figure 12:
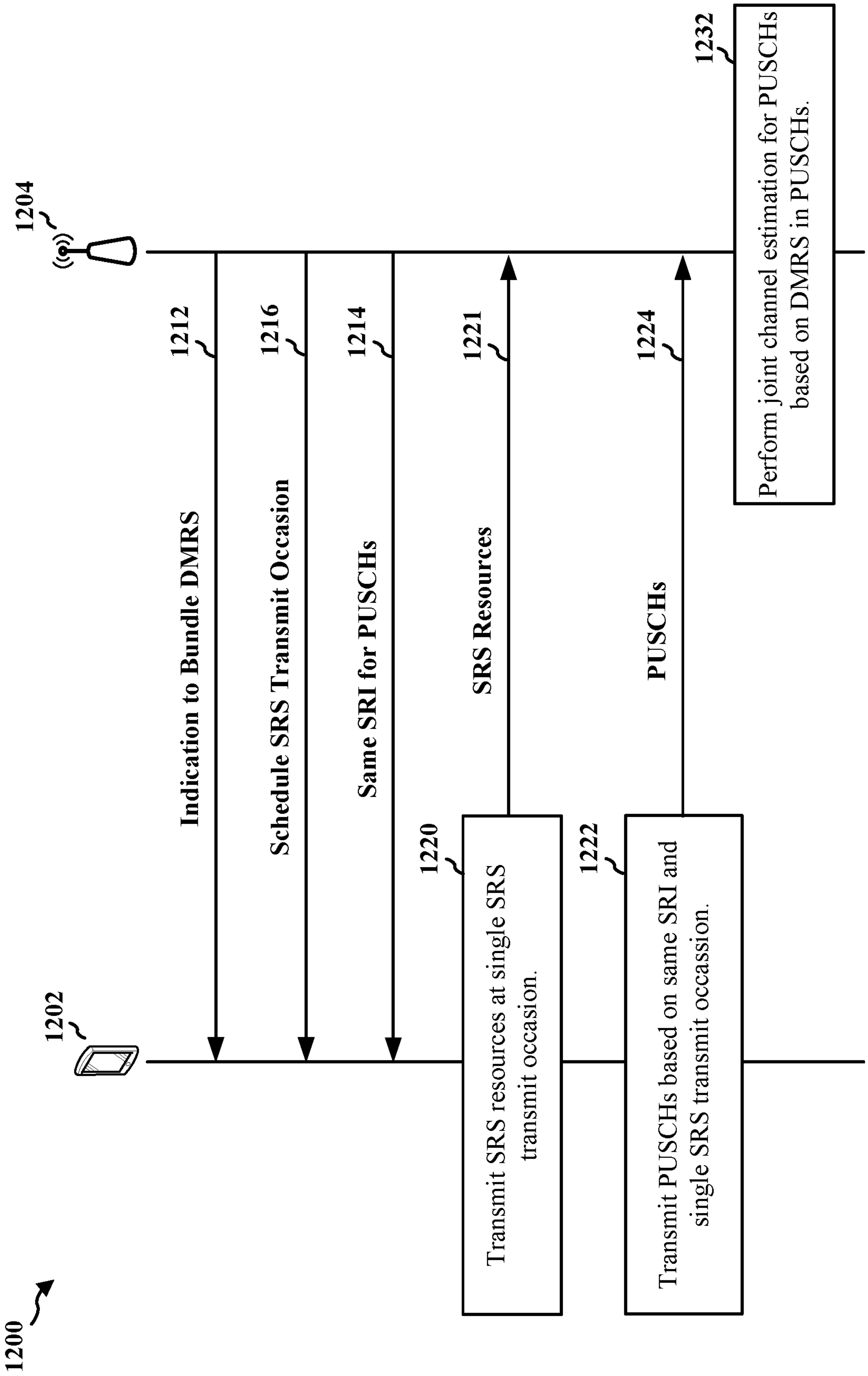
FIG. 12 is a communication flow diagram illustrating transmission of a set of PUSCHs based on a single SRS transmission occasion, where one or more PUSCHs in the set of PUSCHs comprises a DMRS.

FIG. 12 is a communication flow diagram 1200 illustrating transmission of a set of PUSCH based on a single SRS transmission occasion, where each PUSCH in the set of PUSCH comprises a DMRS. A base station 1204 may determine to schedule a set of PUSCHs for uplink from a UE 1202, and that the base station 1204 will perform joint channel estimation for the set of PUSCHs. The base station 1204 may transmit an indication 1212 to the UE 1202 to maintain phase continuity across a set of PUSCHs, and the UE 1202 may receive the indication 1212. For example, the indication 1212 may be the same as described above with respect to the indication 1212 of FIG. 6.

As illustrated at 1216, the base station 1204 may schedule an SRS transmit occasion for the UE 1202. The base station 1204 may not schedule another SRS transmit occasion for the UE 1202 until after the transmission of the set of PUSCHs identified in the indication 1212.

The base station 1214 may transmit SRIs for the set of PUSCHs to the UE 1202, and the UE 1202 may receive the SRIs. The base station 1204 may generate and send the same SRI for each PUSCH of the set of PUSCHs.

As illustrated at 1220, the UE 1202 may transmit SRS resources 1221 at a single transmit occasion. The transmit occasion may be the transmit occasion scheduled by the base station 1204 at 1216. The UE 1202 may not transmit SRS resources at another SRS transmit occasion until after the transmission of the set of PUSCHs identified in the indication 1212.

As illustrated at 1222, the UE 1202 may transmit the set of PUSCHs 1224, where each PUSCH comprises a DMRS. The UE 1202 may transmit the set of PUSCHs 1224 based on the same SRI value received for each PUSCH at 1214. The UE 1202 may interpret the SRI value for each PUSCH based on the single SRS transmit occasion. Accordingly, the UE 1202 may interpret the same SRI value for each PUSCH as identifying the spatial filter used to transmit the same SRS resource at the single SRS transmit occasion, and may transmit each PUSCH based on the same transmission spatial filter.

The base station 1204 may receive the set of PUSCHs 1224. As illustrated at 1232, the base station 1204 may perform joint channel estimation for the set of PUSCHs 1224 based on DMRSs in one or more PUSCHs of the set of PUSCHs 1224. The base station 1204 may generate a channel estimate based on the DMRS of multiple PUSCHs or all of the PUSCHs in the set of PUSCHs 1224. The base station 1204 may use the channel estimate to decode the set of PUSCHs 1224.

Figure 13:
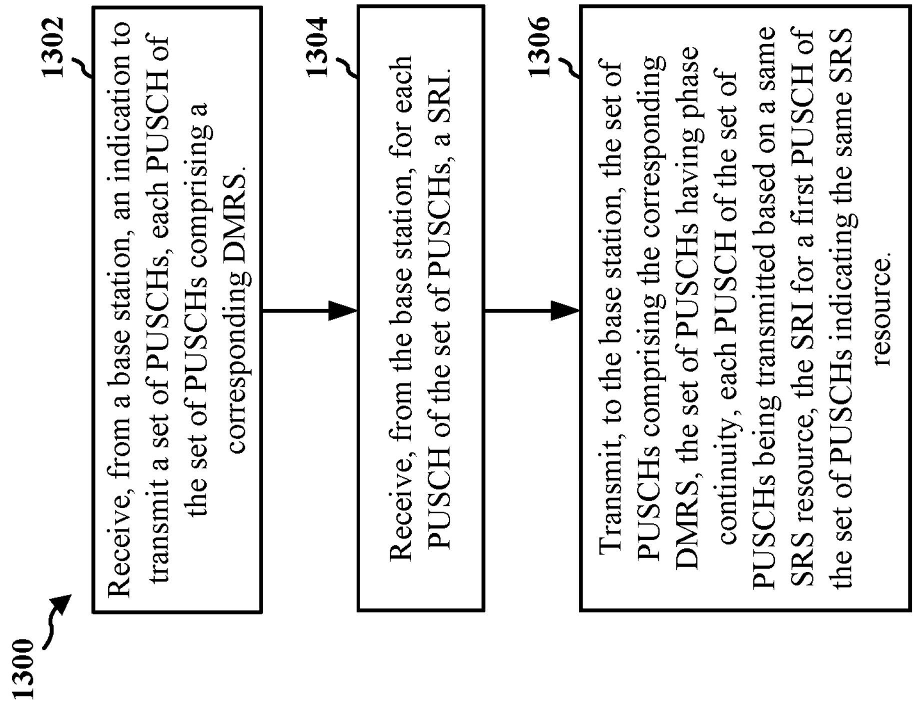
FIG. 13 is a flowchart of a method of wireless communication.

FIG. 13 is a flowchart 1300 of a method of wireless communication. The method may be performed by a UE (e.g., the UE 104, 602, 702, 902, 1002, 1202).

At 1302, the UE may receive, from a base station, an indication to transmit a set of physical uplink shared channels (PUSCHs), each PUSCH of the set of PUSCHs comprising a corresponding demodulation reference signal (DMRS).

At 1304, the UE may receive, from the base station, for each PUSCH of the set of PUSCHs, a sounding reference signal (SRS) resource indicator (SRI). Each SRI for the set of PUSCHs may correspond to a same SRS resource transmission occasion.

At 1306, the UE may transmit to the base station, the set of PUSCHs comprising the corresponding DMRS, the set of PUSCHs having phase continuity, each PUSCH of the set of PUSCHs being transmitted based on a same SRS resource, the SRI for a first PUSCH of the set of PUSCHs indicating the same SRS resource. The SRI for each PUSCH of the set of PUSCHs may indicate the same SRS resource, and each PUSCH of the set of PUSCHs may be transmitted based on its respective SRI. In some aspects, each SRI for the set of PUSCHs corresponds to a same SRS resource transmission occasion. The SRI for a second PUSCH of the set of PUSCHs may indicate a different SRS resource than the same SRS resource, and the second PUSCH may be transmitted based on the same SRS resource. The UE may transmit the set of PUSCHs based on non-codebook transmission.

In some aspects, the UE may receive, from the base station, for each PUSCH of the set of PUSCHs, a transmission rank indicator (TRI) and a transmit precoder matrix indicator (TPMI), wherein each PUSCH of the set of PUSCHs is transmitted based on its respective TRI and TPMI. Each TRI may indicate a same rank, and each TPMI may indicate a same transmit precoder matrix. The UE may transmit the set of PUSCHs based on codebook transmission.

In some aspects, the UE may receive, from the base station, for each PUSCH of the set of PUSCHs, a transmission rank indicator (TRI) and a transmit precoder matrix indicator (TPMI). Each PUSCH of the set of PUSCHs may be transmitted based on its respective TRI and TPMI. Each TRI may indicate a same rank, and transmit precoder matrices indicated by each TPMI of the TPMIs may have a same mapping between antenna port and transmission layer.

In some aspects, the UE may receive, from the base station, for each PUSCH of the set of PUSCHs, a transmission rank indicator (TRI) and a transmit precoder matrix indicator (TPMI). The TRI for the first PUSCH may indicate a first transmission rank, the TPMI for the first PUSCH may indicate a first transmit precoder matrix, the TRI for a second PUSCH may indicate a second transmission rank different from the first transmission rank or the TPMI for the second PUSCH may indicate a second transmit precoder matrix different from the first transmit precoder matrix, and the second PUSCH may be transmitted based on the first transmission rank and the first transmit precoder matrix. The second transmit precoder matrix may have a different mapping between antenna port and transmission layer than the first precoder matrix.

In some aspects, the UE may receive, from the base station, a SRI for a third PUSCH. The SRI for the third PUSCH may indicate a different SRS resource than the same SRS resource. The set of PUSCHs may not comprise the third PUSCH, and the indication may be to transmit the third PUSCH and the set of PUSCHs, where each PUSCH of the set of PUSCHs comprises a corresponding DMRS. The UE may transmit, to the base station, the third PUSCH based on the different SRS resource, wherein a corresponding DMRS of the third PUSCH may not be included in the set of PUSCHs.

In some aspects, the UE may receive, from the base station, a TRI and a TPMI for a third PUSCH. The TRI for the third PUSCH may indicate a different rank than the same rank or the TPMI for the third PUSCH may indicate a different transmit precoder matrix than the same transmit precoder matrix. The set of PUSCHs may not comprise the third PUSCH, and the indication may be to transmit the third PUSCH and the set of PUSCHs. The UE may transmit, to the base station, the third PUSCH based on the different rank or the different transmit precoder matrix. A corresponding DMRS of the third PUSCH may not be included in the set of PUSCHs.

Figure 14:
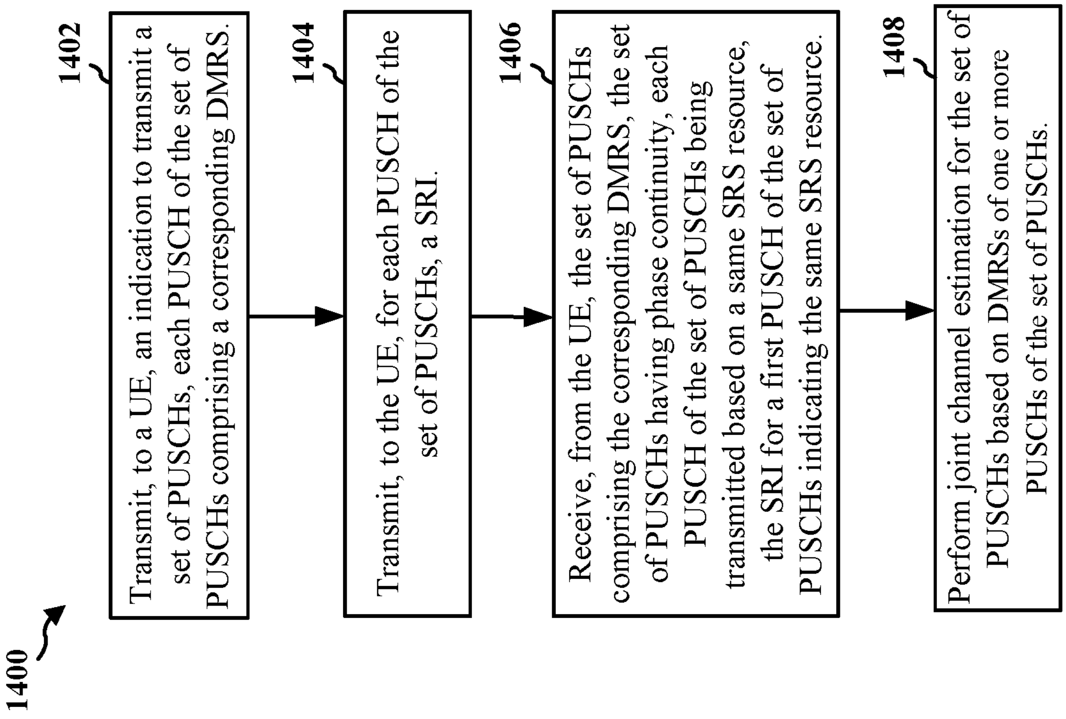
FIG. 14 is a flowchart of a method of wireless communication.

FIG. 14 is a flowchart 1400 of a method of wireless communication. The method may be performed by a base station (e.g., the base station 102/180, 604, 704, 904, 1004, 1204).

At 1402, the base station may transmit, to a user equipment (UE), an indication to transmit a set of physical uplink shared channels (PUSCHs), each PUSCH of the set of PUSCHs comprising a corresponding demodulation reference signal (DMRS).

At 1404, the base station may transmit, to the UE, for each PUSCH of the set of PUSCHs, a sounding reference signal (SRS) resource indicator (SRI). Each SRI for the set of PUSCHs may correspond to a same SRS resource transmission occasion.

At 1406, the base station may receive, from the UE, the set of PUSCHs comprising the corresponding DMRS, the set of PUSCHs having phase continuity, each PUSCH of the set of PUSCHs being received based on a same SRS resource, the SRI for a first PUSCH of the set of PUSCHs indicating the same SRS resource. The SRI for each PUSCH of the set of PUSCHs may indicate the same SRS resource, and each PUSCH of the set of PUSCHs may be received based on its respective SRI. The SRI for a second PUSCH of the set of PUSCHs may indicate a different SRS resource than the same SRS resource, and the second PUSCH may be received based on the same SRS resource. The base station may receive the set of PUSCHs based on non-codebook transmission.

In some aspects, the base station may transmit, to the UE, for each PUSCH of the set of PUSCHs, a transmission rank indicator (TRI) and a transmit precoder matrix indicator (TPMI). Each PUSCH of the set of PUSCHs may be received based on its respective TRI and TPMI. Each TRI may indicate a same rank, and each TPMI may indicate a same transmit precoder matrix. The base station may receive the set of PUSCHs based on codebook transmission.

In some aspects, the base station may transmit, to the UE, for each PUSCH of the set of PUSCHs, a transmission rank indicator (TRI) and a transmit precoder matrix indicator (TPMI). Each PUSCH of the set of PUSCHs may be received based on its respective TRI and TPMI. Each TRI may indicate a same rank, and transmit precoder matrices indicated by each TPMI of the TPMIs may have a same mapping between antenna port and transmission layer.

In some aspects, the base station may transmit, to the UE, for each PUSCH of the set of PUSCHs, a transmission rank indicator (TRI) and a transmit precoder matrix indicator (TPMI). The TRI for the first PUSCH may indicate a first transmission rank, the TPMI for the first PUSCH may indicate a first transmit precoder matrix, the TRI for a second PUSCH may indicate a second transmission rank different from the first transmission rank or the TPMI for the second PUSCH may indicate a second transmit precoder matrix different from the first transmit precoder matrix, and the second PUSCH may be received based on the first transmission rank and the first transmit precoder matrix. The second transmit precoder matrix may have a different mapping between antenna port and transmission layer than the first precoder matrix.

At 1408, the base station may perform joint channel estimation for the set of PUSCHs based on DMRSs of one or more PUSCHs of the set of PUSCHs.

In some aspects, the base station may transmit, to the UE, a SRI for a third PUSCH. The SRI for the third PUSCH may indicate a different SRS resource than the same SRS resource. The set of PUSCHs may not comprise the third PUSCH, and the indication may be to transmit the third PUSCH and the set of PUSCHs, where each PUSCH of the set of PUSCHs comprises a corresponding DMRS. The UE base station may receive, from the UE, the third PUSCH based on the different SRS resource. A DMRS of the third PUSCH may not be included in the set of PUSCHs. The base station may perform a channel estimation for the third PUSCH based on the DMRS of the third PUSCH.

In some aspects, the base station may transmit, to the UE, a TRI and a TPMI for a third PUSCH. The TRI for the third PUSCH may indicate a different rank than the same rank or the TPMI for the third PUSCH may indicate a different transmit precoder matrix than the same transmit precoder matrix. The set of PUSCHs may not comprise the third PUSCH, and the indication may be to transmit the third PUSCH and the set of PUSCHs, where each PUSCH of the set of PUSCHs comprises a corresponding DMRS. The base station may receive, from the UE, the third PUSCH based on the different rank or the different transmit precoder matrix, wherein a DMRS of the third PUSCH may not be included in the set of PUSCHs, may not included in the DMRSs of PUSCHs in the set of PUSCHs, may not be the same as a DMRS of PUSCH in the set of PUSCHs, and/or may not be a corresponding DMRS of PUSCHs in the set of PUSCHs. The base station may perform a channel estimation for the third PUSCH based on the DMRS of the third PUSCH.

Figure 15:
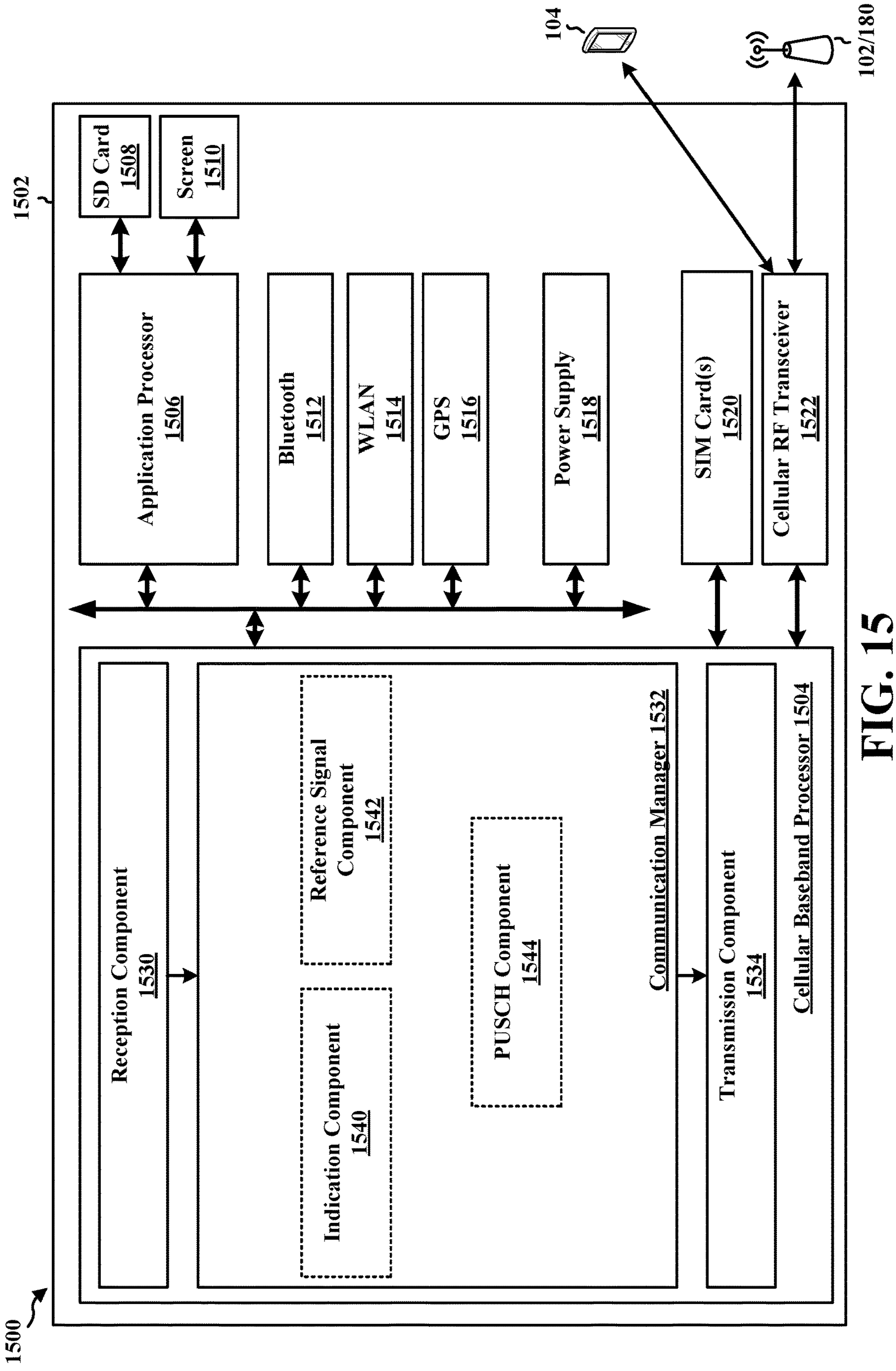
FIG. 15 is a diagram illustrating an example of a hardware implementation for an example apparatus.

FIG. 15 is a diagram 1500 illustrating an example of a hardware implementation for an apparatus 1502. The apparatus 1502 is a UE and includes a cellular baseband processor 1504 (also referred to as a modem) coupled to a cellular RF transceiver 1522 and one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the aforediscussed additional modules of the apparatus 1502.

The communication manager 1532 includes a transmission indication component 1540 that is configured to receive an indication to transmit a set of physical uplink shared channels (PUSCHs), each PUSCH comprising a demodulation reference signals (DMRS), e.g., as described in connection with 1302 of FIG. 13. The communication manager 1532 further includes a reference signal component 1542 that is configured to receive for each PUSCH of the set of PUSCHs, a sounding reference signal (SRS) resource indicator (SRI), e.g., as described in connection with 1304 of FIG. 13. The communication manager 1532 further includes a PUSCH component 1544 that is configured to transmit the set of PUSCHs comprising the corresponding DMRS, the set of PUSCHs having phase continuity, each PUSCH of the set of PUSCHs being transmitted based on a same SRS resource, the SRI for a first PUSCH of the set of PUSCHs indicating the first SRS resource, e.g., as described in connection with 1306 of FIG. 13.

The apparatus may include additional components that perform each of the blocks of the algorithm in the aforementioned flowcharts of FIG. 13. As such, each block in the aforementioned flowcharts of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the cellular baseband processor 1504, includes means for receiving, from a base station, an indication to transmit a set of physical uplink shared channels (PUSCHs), each PUSCH of the set of PUSCHs comprising a corresponding demodulation reference signal (DMRS), means for receiving, from the base station, for each PUSCH of the set of PUSCHs, a sounding reference signal (SRS) resource indicator (SRI), and means for transmitting, to the base station, the set of PUSCHs comprising the corresponding DMRS, the set of PUSCHs having phase continuity, each PUSCH of the set of PUSCHs being transmitted based on a first SRS resource, the SRI for a first PUSCH of the set of PUSCHs indicating the first SRS resource. The aforementioned means may be one or more of the aforementioned components of the apparatus 1502 configured to perform the functions recited by the aforementioned means. As described supra, the apparatus 1502 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 16:
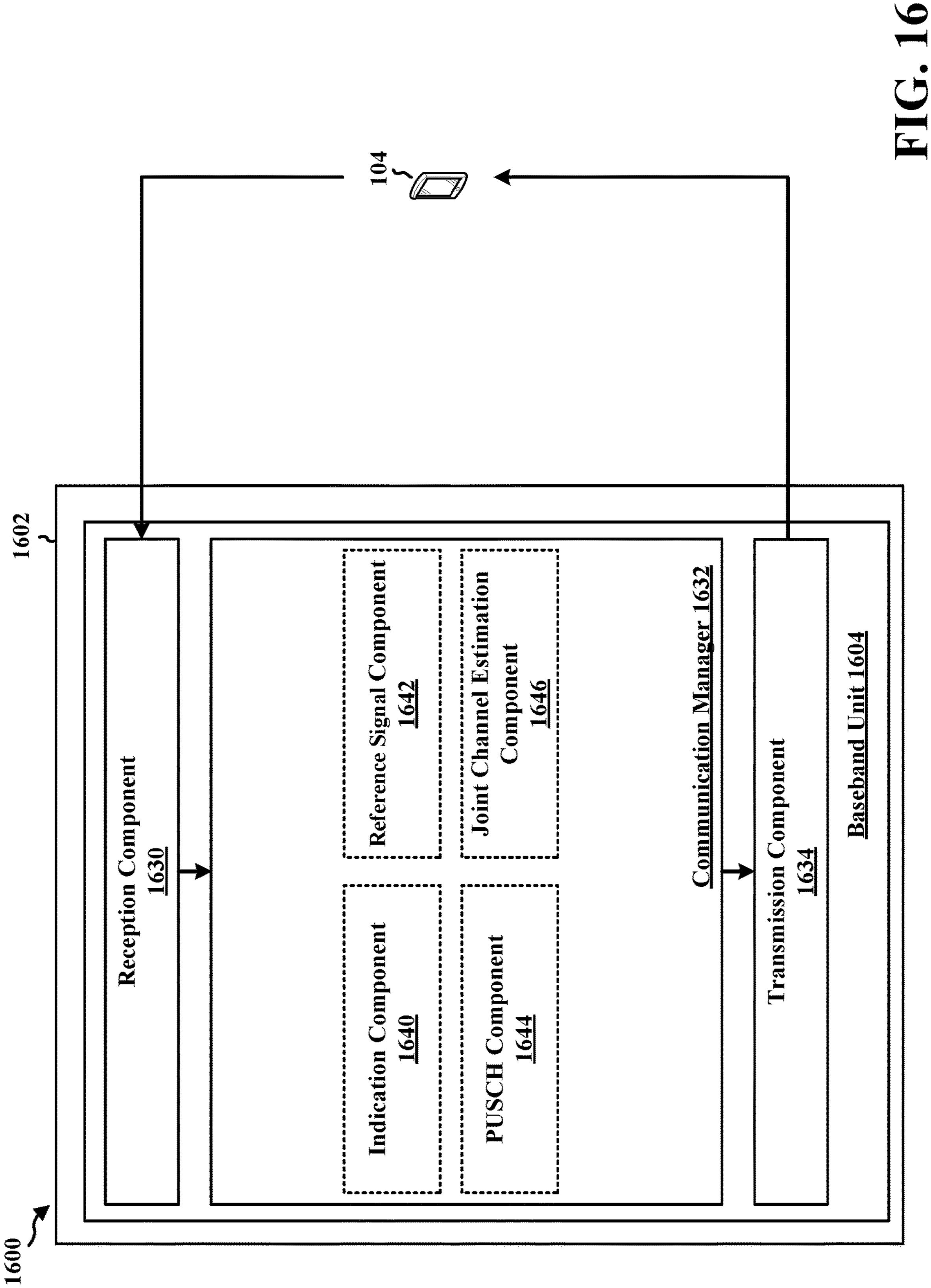
FIG. 16 is a diagram illustrating an example of a hardware implementation for an example apparatus

FIG. 16 is a diagram 1600 illustrating an example of a hardware implementation for an apparatus 1602. The apparatus 1602 is a BS and includes a baseband unit 1604. The baseband unit 1604 may communicate through a cellular RF transceiver with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the BS 310 and may include the memory 376 and/or at least one of the TX processor 316, the RX processor 370, and the controller/processor 375.

The communication manager 1632 includes an indication component 1640 that transmits an indication to transmit a set of physical uplink shared channels (PUSCHs), each PUSCH comprising a demodulation reference signals (DMRS), e.g., as described in connection with 1402 of FIG. 14. The communication manager 1632 further includes a reference signal component 1642 that transmits for each PUSCH of the set of PUSCHs, a sounding reference signal (SRS) resource indicator (SRI), e.g., as described in connection with 1404 of FIG. 14. The communication manager 1632 further includes a PUSCH component 1644 that receives each PUSCH comprising the corresponding DMRS, the set of PUSCHs having phase continuity, each PUSCH of the set of PUSCHs being received based on a same SRS resource, the SRI for a first PUSCH of the set of PUSCHs indicating the same SRS resource, e.g., as described in connection with 1406 of FIG. 14. The communication manager 1632 further includes joint channel estimation component 1646 that performs joint channel estimation for the set of PUSCHs based on the DMRS comprised in the set of the PUSCHs.

The apparatus may include additional components that perform each of the blocks of the algorithm in the aforementioned flowcharts of FIG. 14. As such, each block in the aforementioned flowcharts of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the baseband unit 1604, includes means for transmitting, to a user equipment (UE), an indication to transmit a set of physical uplink shared channels (PUSCHs), each PUSCH comprising a demodulation reference signal (DMRS), means for transmitting, to the UE, for each PUSCH of the set of PUSCHs, a sounding reference signal (SRS) resource indicator (SRI), means for receiving, from the UE, the set of PUSCHs, each PUSCH comprising the corresponding DMRS, the set of PUSCHs having phase continuity, each PUSCH of the set of PUSCHs being received based on a same SRS resource, the SRI for a first PUSCH of the set of PUSCHs indicating the same SRS resource. The aforementioned means may be one or more of the aforementioned components of the apparatus 1602 configured to perform the functions recited by the aforementioned means. As described supra, the apparatus 1602 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment (UE), comprising: receiving, from a base station, an indication to transmit a set of physical uplink shared channels (PUSCHs), each PUSCH of the set of PUSCHs comprising a corresponding demodulation reference signals (DMRS); receiving, from the base station, for each PUSCH of the set of PUSCHs, a sounding reference signal (SRS) resource indicator (SRI); and transmitting, to the base station, the set of PUSCHs comprising the corresponding DMRS, the set of PUSCHs having phase continuity, each PUSCH of the set of PUSCHs being transmitted based on a same SRS resource, the SRI for a first PUSCH of the set of PUSCHs indicating the same SRS resource.

Example 2 is the method of Example 1, wherein the SRI for each PUSCH of the set of PUSCHs indicates the same SRS resource, and wherein each PUSCH of the set of PUSCHs is transmitted based on its respective SRI.

Example 3 is the method of any of Examples 1 and 2, wherein the SRI for a second PUSCH of the set of PUSCHs indicates a different SRS resource than the same SRS resource, and wherein the second PUSCH is transmitted based on the same SRS resource.

Example 4 is the method of any of Examples 1 to 3, wherein the UE transmits the set of PUSCHs based on non-codebook transmission.

Example 5 is the method of any of Examples 1 to 4, further comprising: receiving, from the base station, for each PUSCH of the set of PUSCHs, a transmission rank indicator (TRI) and a transmit precoder matrix indicator (TPMI), wherein each PUSCH of the set of PUSCHs is transmitted based on its respective TRI and TPMI, wherein each TRI indicates a same rank, and wherein each TPMI indicates a same transmit precoder matrix.

Example 6 is the method of any of Examples 1 to 5, wherein the UE transmits the set of PUSCHs based on codebook transmission.

Example 7 is the method of any of Examples 1 to 6, further comprising: receiving, from the base station, a TRI and a TPMI for a third PUSCH from the base station, the TRI for the third PUSCH indicating a different rank than the same rank or the TPMI for the third PUSCH indicating a different transmit precoder matrix than the same transmit precoder matrix, wherein the set of PUSCHs does not comprise the third PUSCH, and wherein the indication is to transmit the third PUSCH and the set of PUSCHs; and transmitting, to the base station, the third PUSCH based on the different rank or the different transmit precoder matrix, wherein a DMRS of the third PUSCH is not included in the DMRSs of PUSCHs in the set of PUSCHs.

Example 8 is the method of any of Examples 1 to 7, further comprising: receiving, from the base station, for each PUSCH of the set of PUSCHs, a transmission rank indicator (TRI) and a transmit precoder matrix indicator (TPMI), wherein each PUSCH of the set of PUSCHs is transmitted based on its respective TRI and TPMI, wherein each TRI indicates a same rank, and wherein transmit precoder matrices indicated by each TPMI of the TPMIs have a same mapping between antenna port and transmission layer.

Example 9 is the method of any of Examples 1 to 8, further comprising receiving, from the base station, for each PUSCH of the set of PUSCHs, a transmission rank indicator (TRI) and a transmit precoder matrix indicator (TPMI), wherein: the TRI for the first PUSCH indicates a first transmission rank, the TPMI for the first PUSCH indicates a first transmit precoder matrix, the TRI for a second PUSCH indicates a second transmission rank different from the first transmission rank or the TPMI for the second PUSCH indicates a second transmit precoder matrix different from the first transmit precoder matrix, and the second PUSCH is transmitted based on the first transmission rank and the first transmit precoder matrix.

Example 10 is the method of any of Examples 1 to 9, wherein the second transmit precoder matrix has a different mapping between antenna port and transmission layer than the first precoder matrix.

Example 11 is the method of any of Examples 1 to 10, wherein each SRI for the set of PUSCHs corresponds to a same SRS resource transmission occasion.

Example 12 is the method of any of Examples 1 to 11, further comprising: receiving, from the base station, a SRI for a third PUSCH from the base station, the SRI for the third PUSCH indicating a different SRS resource than the same SRS resource, wherein the set of PUSCHs does not comprise the third PUSCH, and wherein the indication is to transmit the third PUSCH and the set of PUSCHs; and transmitting, to the base station, the third PUSCH based on the different SRS resource, wherein a DMRS of the third PUSCH is not included in the DMRSs of PUSCHs in the set of PUSCHs.

Example 13 is a method of wireless communication at a base station, comprising: transmitting, to a user equipment (UE), an indication to transmit a set of physical uplink shared channels (PUSCHs), one or more PUSCHs of the set of PUSCHs comprising a demodulation reference signal (DMRS); transmitting, to the UE, for each PUSCH of the set of PUSCHs, a sounding reference signal (SRS) resource indicator (SRI); and receiving, from the UE, the set of PUSCHs, one or more PUSCHs of the set of PUSCHs comprising corresponding DMRS, the set of PUSCHs having phase continuity, each PUSCH of the set of PUSCHs being received based on a same SRS resource, the SRI for a first PUSCH of the set of PUSCHs indicating the same SRS resource.

Example 14 is the method of Example 13, further comprising performing joint channel estimation for the set of PUSCHs based on one or more DMRSs comprised in one or more PUSCHs in the set of PUSCHs.

Example 15 is the method of any of Examples 13 and 14, wherein the SRI for each PUSCH of the set of PUSCHs indicates the same SRS resource, and wherein each PUSCH of the set of PUSCHs is received based on its respective SRI.

Example 16 is the method of any of Examples 13 to 15, wherein the SRI for a second PUSCH of the set of PUSCHs indicates a different SRS resource than the same SRS resource, and wherein the second PUSCH is received based on the same SRS resource.

Example 17 is the method of any of Examples 13 to 16, wherein the base station receives the set of PUSCHs based on non-codebook transmission.

Example 19 is the method of any of Examples 13 to 17, further comprising: transmitting, to the UE, for each PUSCH of the set of PUSCHs, a transmission rank indicator (TRI) and a transmit precoder matrix indicator (TPMI), wherein each PUSCH of the set of PUSCHs is received based on its respective TRI and TPMI, wherein each TRI indicates a same rank, and wherein each TPMI indicates a same transmit precoder matrix.

Example 19 is the method of any of Examples 13 to 18, wherein the base station receives the set of PUSCHs based on codebook transmission.

Example 20 is the method of any of Examples 13 to 19, further comprising: transmitting, to the UE, a TRI and a TPMI for a third PUSCH, the TRI for the third PUSCH indicating a different rank than the same rank or the TPMI for the third PUSCH indicating a different transmit precoder matrix than the same transmit precoder matrix, wherein the set of PUSCHs does not comprise the third PUSCH, and wherein the indication is to transmit the third PUSCH and the set of PUSCHs, where one or more PUSCHs in the set of PUSCHs comprises a corresponding DMRS; receiving, from the UE, the third PUSCH based on the different rank or the different transmit precoder matrix, wherein a DMRS of the third PUSCH is not included in the DMRSs of PUSCHs in the set of PUSCHs; and performing a channel estimation for the third PUSCH based on the DMRS of the third PUSCH.

Example 21 is the method of any of Examples 13 to 20, further comprising: transmitting, to the UE, for each PUSCH of the set of PUSCHs, a transmission rank indicator (TRI) and a transmit precoder matrix indicator (TPMI), wherein each PUSCH of the set of PUSCHs is received based on its respective TRI and TPMI, wherein each TRI indicates a same rank, and wherein transmit precoder matrices indicated by each TPMI of the TPMIs have a same mapping between antenna port and transmission layer.

Example 22 is the method of any of Examples 13 to 21, further comprising transmitting, to the UE, for each PUSCH of the set of PUSCHs, a transmission rank indicator (TRI) and a transmit precoder matrix indicator (TPMI), wherein: the TRI for the first PUSCH indicates a first transmission rank, the TPMI for the first PUSCH indicates a first transmit precoder matrix, the TRI for a second PUSCH indicates a second transmission rank different from the first transmission rank or the TPMI for the second PUSCH indicates a second transmit precoder matrix different from the first transmit precoder matrix, and the second PUSCH is received based on the first transmission rank and the first transmit precoder matrix.

Example 23 is the method of any of Examples 13 to 22, wherein the second transmit precoder matrix has a different mapping between antenna port and transmission layer than the first precoder matrix.

Example 24 is the method of any of Examples 13 to 23, wherein each SRI for the set of PUSCHs corresponds to a same SRS resource transmission occasion.

Example 25 is the method of any of Examples 13 to 24, further comprising: transmitting, to the UE, a SRI for a third PUSCH, the SRI for the third PUSCH indicating a different SRS resource than the same SRS resource, wherein the set of PUSCHs does not comprise the third PUSCH, and wherein the indication is to transmit the third PUSCH and the set of PUSCHs, where one or more PUSCHs in the set of PUSCHs comprises a DMRS; receiving, from the UE, the third PUSCH based on the different SRS resource, wherein a DMRS of the third PUSCH is not included in the DMRSs of PUSCHs in the set of PUSCHs; and performing a channel estimation for the third PUSCH based on the DMRS of the third PUSCH.

Example 26 is an apparatus for wireless communication at a user equipment (UE), comprising: means for receiving, from a base station, an indication to transmit a set of physical uplink shared channels (PUSCHs), one or more PUSCHs in the set of PUSCHs comprising at least a corresponding demodulation reference signals (DMRS); means for receiving, from the base station, for each PUSCH of the set of PUSCHs, a sounding reference signal (SRS) resource indicator (SRI); and means for transmitting, to the base station, the set of PUSCHs comprising at least the corresponding DMRS, the set of PUSCHs having phase continuity, each PUSCH of the set of PUSCHs being transmitted based on a same SRS resource, the SRI for a first PUSCH of the set of PUSCHs indicating the same SRS resource.

Example 27 is an apparatus for wireless communication at a user equipment (UE) comprising: a memory; and at least one processor coupled to the memory and configured to: receive, from a base station, an indication to transmit a set of physical uplink shared channels (PUSCHs), one or more PUSCHs in the set of PUSCHs comprising at least a corresponding demodulation reference signals (DMRS); receive, from the base station, for each PUSCH of the set of PUSCHs, a sounding reference signal (SRS) resource indicator (SRI); and transmit, to the base station, the set of PUSCHs comprising the at least the corresponding DMRS, the set of PUSCHs having phase continuity, each PUSCH of the set of PUSCHs being transmitted based on a same SRS resource, the SRI for a first PUSCH of the set of PUSCHs indicating the same SRS resource.

Example 28 is the apparatus of Example 27, wherein the SRI for each PUSCH of the set of PUSCHs indicates the same SRS resource, and wherein each PUSCH of the set of PUSCHs is transmitted based on its respective SRI.

Example 29 is the apparatus of any of Examples 27 and 28, wherein the SRI for a second PUSCH of the set of PUSCHs indicates a different SRS resource than the same SRS resource, and wherein the second PUSCH is transmitted based on the same SRS resource.

Example 30 is the apparatus of any of Examples 27 to 29, wherein the at least one processor transmits the set of PUSCHs based on non-codebook transmission.

Example 31 is the apparatus of any of Examples 27 to 30, wherein the at least one processor is further configured to: receive, from the base station, for each PUSCH of the set of PUSCHs, a transmission rank indicator (TRI) and a transmit precoder matrix indicator (TPMI), wherein each PUSCH of the set of PUSCHs is transmitted based on its respective TRI and TPMI, wherein each TRI indicates a same rank, and wherein each TPMI indicates a same transmit precoder matrix.

Example 32 is the apparatus of any of Examples 27 to 31, wherein the at least one processor transmits the set of PUSCHs based on codebook transmission.

Example 33 is the apparatus of any of Examples 27 to 32, wherein the at least one processor is further configured to: receive, from the base station, a TRI and a TPMI for a third PUSCH from the base station, the TRI for the third PUSCH indicating a different rank than the same rank or the TPMI for the third PUSCH indicating a different transmit precoder matrix than the same transmit precoder matrix, wherein the set of PUSCHs does not comprise the third PUSCH, and wherein the indication is to transmit the third PUSCH and the set of PUSCHs, where one or more PUSCHs in the set of PUSCHs comprise a DMRS; and transmit, to the base station, the third PUSCH based on the different rank or the different transmit precoder matrix, wherein a DMRS of the third PUSCH is not included in the DMRSs of PUSCHs in the set of PUSCHs.

Example 34 is the apparatus of any of Examples 27 to 33, wherein the at least one processor is further configured to: receive, from the base station, for each PUSCH of the set of PUSCHs, a transmission rank indicator (TRI) and a transmit precoder matrix indicator (TPMI), wherein each PUSCH of the set of PUSCHs is transmitted based on its respective TRI and TPMI, wherein each TRI indicates a same rank, and wherein transmit precoder matrices indicated by each TPMI of the TPMIs have a same mapping between antenna port and transmission layer.

Example 35 is the apparatus of any of Examples 27 to 34, wherein the at least one processor is further configured to receive, from the base station, for each PUSCH of the set of PUSCHs, a transmission rank indicator (TRI) and a transmit precoder matrix indicator (TPMI), wherein: the TRI for the first PUSCH indicates a first transmission rank, the TPMI for the first PUSCH indicates a first transmit precoder matrix, the TRI for a second PUSCH indicates a second transmission rank different from the first transmission rank or the TPMI for the second PUSCH indicates a second transmit precoder matrix different from the first transmit precoder matrix, and the second PUSCH is transmitted based on the first transmission rank and the first transmit precoder matrix.

Example 36 is the apparatus of any of Examples 27 to 35, wherein the second transmit precoder matrix has a different mapping between antenna port and transmission layer than the first precoder matrix.

Example 37 is the apparatus of any of Examples 27 to 36, wherein each SRI for the set of PUSCHs corresponds to a same SRS resource transmission occasion.

Example 38 is the apparatus of any of Examples 27 to 37, wherein the at least one processor is further configured to: receive, from the base station, a SRI for a third PUSCH from the base station, the SRI for the third PUSCH indicating a different SRS resource than the same SRS resource, wherein the set of PUSCHs does not comprise the third PUSCH, and wherein the indication is to transmit the third PUSCH and the set of PUSCHs, where one or more PUSCHs in the set of PUSCHs comprise a DMRS; and transmit, to the base station, the third PUSCH based on the different SRS resource, wherein a DMRS of the third PUSCH is not included in the DMRSs of PUSCHs in the set of PUSCHs.

Example 39 is non-transitory computer-readable medium storing computer executable code for wireless communication at a user equipment the code when executed by a processor cause the processor to perform the method of any of Examples 1-12.

Example 40 is an apparatus for wireless communication at a base station, comprising: means for transmitting, to a user equipment (UE), an indication to transmit a set of physical uplink shared channels (PUSCHs) with bundled demodulation reference signals (DMRS); means for transmitting, to the UE, for each PUSCH of the set of PUSCHs, a sounding reference signal (SRS) resource indicator (SRI); and means for receiving, from the UE, the set of PUSCHs, where one or more PUSCHs in the set of PUSCHs comprise a DMRS, each PUSCH of the set of PUSCHs being received based on a same SRS resource, the SRI for a first PUSCH of the set of PUSCHs indicating the same SRS resource.

Example 41 is an apparatus for wireless communication at a base station comprising: a memory; and at least one processor coupled to the memory and configured to: transmit, to a user equipment (UE), an indication to transmit a set of physical uplink shared channels (PUSCHs) with bundled demodulation reference signals (DMRS); transmit, to the UE, for each PUSCH of the set of PUSCHs, a sounding reference signal (SRS) resource indicator (SRI); and receive, from the UE, the set of PUSCHs, where one or more PUSCHs in the set of PUSCHs comprise a DMRS, each PUSCH of the set of PUSCHs being received based on a same SRS resource, the SRI for a first PUSCH of the set of PUSCHs indicating the same SRS resource.

Example 42 is the apparatus of Example 41, wherein the at least one processor is further configured to: perform joint channel estimation for the set of PUSCHs based on the bundled DMRS.

Example 43 is the apparatus of any of Examples 41 and 42, wherein the SRI for each PUSCH of the set of PUSCHs indicates the same SRS resource, and wherein each PUSCH of the set of PUSCHs is received based on its respective SRI.

Example 44 is the apparatus of any of Examples 41 to 43, wherein the SRI for a second PUSCH of the set of PUSCHs indicates a different SRS resource than the same SRS resource, and wherein the second PUSCH is received based on the same SRS resource.

Example 45 is the apparatus of any of Examples 41 to 44, wherein the at least one processor receives the set of PUSCHs based on non-codebook transmission.

Example 46 is the apparatus of any of Examples 41 to 45, wherein the at least one processor is further configured to: transmit, to the UE, for each PUSCH of the set of PUSCHs, a transmission rank indicator (TRI) and a transmit precoder matrix indicator (TPMI), wherein each PUSCH of the set of PUSCHs is received based on its respective TRI and TPMI, wherein each TRI indicates a same rank, and wherein each TPMI indicates a same transmit precoder matrix.

Example 47 is the apparatus of any of Examples 41 to 46, wherein the at least one processor receives the set of PUSCHs based on codebook transmission.

Example 48 is the apparatus of any of Examples 41 to 47, wherein the at least one processor is further configured to: transmit, to the UE, a TRI and a TPMI for a third PUSCH, the TRI for the third PUSCH indicating a different rank than the same rank or the TPMI for the third PUSCH indicating a different transmit precoder matrix than the same transmit precoder matrix, wherein the set of PUSCHs does not comprise the third PUSCH, and wherein the indication is to transmit the third PUSCH and the set of PUSCHs, where one or more PUSCHs in the set of PUSCHs comprise a DMRS; receive, from the UE, the third PUSCH based on the different rank or the different transmit precoder matrix, wherein a DMRS of the third PUSCH is not included in the DMRSs of PUSCHs in the set of PUSCHs; and perform a channel estimation for the third PUSCH based on the DMRS of the third PUSCH.

Example 49 is the apparatus of any of Examples 41 to 48, wherein the at least one processor is further configured to: transmit, to the UE, for each PUSCH of the set of PUSCHs, a transmission rank indicator (TRI) and a transmit precoder matrix indicator (TPMI), wherein each PUSCH of the set of PUSCHs is received based on its respective TRI and TPMI, wherein each TRI indicates a same rank, and wherein transmit precoder matrices indicated by each TPMI of the TPMIs have a same mapping between antenna port and transmission layer.

Example 50 is the apparatus of any of Examples 41 to 49, wherein the at least one processor is further configured to transmit, to the UE, for each PUSCH of the set of PUSCHs, a transmission rank indicator (TRI) and a transmit precoder matrix indicator (TPMI), wherein: the TRI for the first PUSCH indicates a first transmission rank, the TPMI for the first PUSCH indicates a first transmit precoder matrix, the TRI for a second PUSCH indicates a second transmission rank different from the first transmission rank or the TPMI for the second PUSCH indicates a second transmit precoder matrix different from the first transmit precoder matrix, and the second PUSCH is received based on the first transmission rank and the first transmit precoder matrix.

Example 51 is the apparatus of any of Examples 41 to 50, wherein the second transmit precoder matrix has a different mapping between antenna port and transmission layer than the first precoder matrix.

Example 52 is the apparatus of any of Examples 41 to 51, wherein each SRI for the set of PUSCHs corresponds to a same SRS resource transmission occasion.

Example 53 is the apparatus of any of Examples 41 to 52, wherein the at least one processor is further configured to: transmit, to the UE, a SRI for a third PUSCH, the SRI for the third PUSCH indicating a different SRS resource than the same SRS resource, wherein the set of PUSCHs does not comprise the third PUSCH, and wherein the indication is to transmit the third PUSCH and the set of PUSCHs, where one or more PUSCHs in the set of PUSCHs comprise a DMRS; receive, from the UE, the third PUSCH based on the different SRS resource, wherein a DMRS of the third PUSCH is not included in the DMRSs of PUSCHs in the set of PUSCHs; and perform a channel estimation for the third PUSCH based on the DMRS of the third PUSCH.

Example 54 is a non-transitory computer-readable medium storing computer executable code for wireless communication at a base station the code when executed by a processor cause the processor to perform the method of any of Examples 13-25.

What is claimed is:

1. A method of wireless communication at a user equipment (UE), comprising:

receiving, from a base station, an indication to transmit a set of physical uplink shared channels (PUSCHs), each PUSCH of the set of PUSCHs comprising a corresponding demodulation reference signal (DMRS);

receiving, from the base station, for a first PUSCH of the set of PUSCHs, a first sounding reference signal (SRS) resource indicator (SRI) and for a second PUSCH of the set of PUSCHs, a second SRI; and transmitting, to the base station, the first PUSCH and the second PUSCH of the set of PUSCHs comprising the corresponding DMRS, wherein the first PUSCH and the second PUSCH maintain phase continuity responsive to the first SRI being equal to the second SRI.

2. The method of claim 1, wherein the SRI for the second PUSCH of the set of PUSCHs indicates a different SRS resource than the first SRS resource, and wherein the second PUSCH is transmitted based on the first SRS resource.

3. The method of claim 1, wherein the first PUSCH and the second PUSCH do not maintain phase continuity responsive to the first PUSCH and the second PUSCH being transmitted based on a first SRI of 0 and a second SRI of 0.

4. The method of claim 1, further comprising:

transmitting, to the base station, the first and second SRS resources at a single transmit occasion.

5. The method of claim 1, wherein the SRI for each PUSCH of the set of PUSCHs indicates the first SRS resource, wherein each PUSCH of the set of PUSCHs is transmitted based on its respective SRI, and wherein each SRI for the set of PUSCHs corresponds to a same SRS resource transmission occasion.

6. The method of claim 1, wherein the UE transmits the set of PUSCHs based on at least one of a codebook transmission or a non-codebook transmission.

7. The method of claim 1, further comprising:

receiving, from the base station, for each PUSCH of the set of PUSCHs, a same transmission rank indicator (TRI) and a same transmit precoder matrix indicator (TPMI), wherein each PUSCH of the set of PUSCHs is transmitted based on its respective TRI and TPMI.

8. The method of claim 7, further comprising:

receiving, from the base station, a TRI and a TPMI for a third PUSCH from the base station, the TRI for the third PUSCH indicating a different rank than the same rank or the TPMI for the third PUSCH indicating a different transmit precoder matrix than the same transmit precoder matrix, wherein the set of PUSCHs does not comprise the third PUSCH, and wherein the indication is to transmit the third PUSCH and the set of PUSCHs; and transmitting, to the base station, the third PUSCH based on the different rank or the different transmit precoder matrix, wherein a DMRS of the third PUSCH is not included in the DMRSs of PUSCHs in the set of PUSCHs.

9. A method of wireless communication at a base station, comprising:

transmitting, to a user equipment (UE), an indication to transmit a set of physical uplink shared channels (PUSCHs), each PUSCH of the set of PUSCHs comprising a corresponding demodulation reference signal (DMRS);

transmitting, to the UE, for a first PUSCH of the set of PUSCHs, a first sounding reference signal (SRS) resource indicator (SRI) and for a second PUSCH of the set of PUSCHs, a second SRI; and receiving, from the UE, the first PUSCH and the second PUSCH of the set of PUSCHs comprising the corresponding DMRS, wherein the first PUSCH and the second PUSCH maintain phase continuity responsive to the first SRI being equal to the second SRI.

10. The method of claim 9, wherein the SRI for the second PUSCH of the set of PUSCHs indicates a different SRS resource than the first SRS resource, and wherein the second PUSCH is transmitted based on the first SRS resource.

11. The method of claim 9, wherein the first PUSCH and the second PUSCH do not maintain phase continuity in response to the first PUSCH and the second PUSCH being transmitted based on a first SRI of 0 and a second SRI of 0.

12. The method of claim 9, further comprising:

receiving, from the UE, the first and second SRS resources at a single transmit occasion.

13. The method of claim 9, further comprising:

performing joint channel estimation for the set of PUSCHs based on the DMRS comprised in the set of the PUSCHs.

14. The method of claim 9, wherein the SRI for a second PUSCH of the set of PUSCHs indicates a different SRS resource than the first SRS resource, and wherein the second PUSCH is received based on the first SRS resource.

15. The method of claim 9, further comprising:

transmitting, to the UE, for each PUSCH of the set of PUSCHs, a same transmission rank indicator (TRI) and a same transmit precoder matrix indicator (TPMI), wherein each PUSCH of the set of PUSCHs is received based on its respective TRI and TPMI.

16. The method of claim 15, further comprising:

transmitting, to the UE, a TRI and a TPMI for a third PUSCH, the TRI for the third PUSCH indicating a different rank than the same rank or the TPMI for the third PUSCH indicating a different transmit precoder matrix than the same transmit precoder matrix, wherein the set of PUSCHs does not comprise the third PUSCH, and wherein the indication is to transmit the third PUSCH and the set of PUSCHs;

receiving, from the UE, the third PUSCH based on the different rank or the different transmit precoder matrix, wherein a DMRS of the third PUSCH is not included in the DMRSs of PUSCHs in the set of PUSCHs; and performing a channel estimation for the third PUSCH based on the DMRS of the third PUSCH.

17. The method of claim 9, further comprising:

transmitting, to the UE, for each PUSCH of the set of PUSCHs, a transmission rank indicator (TRI) and a transmit precoder matrix indicator (TPMI), wherein each PUSCH of the set of PUSCHs is received based on its respective TRI and TPMI, wherein each TRI indicates a same rank, and wherein transmit precoder matrices indicated by each TPMI of the TPMIs have a same mapping between antenna port and transmission layer.

18. An apparatus for wireless communication at a user equipment (UE) comprising:

a memory; and at least one processor coupled to the memory and configured to:

receive, from a base station, an indication to transmit a set of physical uplink shared channels (PUSCHs), each PUSCH of the set of PUSCHs comprising a corresponding demodulation reference signal (DMRS);

receive, from the base station, for a first PUSCH of the set of PUSCHs, a first sounding reference signal (SRS) resource indicator (SRI) and for a second PUSCH of the set of PUSCHs, a second SRI; and transmit, to the base station, the first PUSCH and the second PUSCH of the set of PUSCHs comprising the corresponding DMRS, wherein the first PUSCH and the second PUSCH maintain phase continuity responsive to the first SRI being equal to the second SRI.

19. The apparatus of claim 18, wherein the SRI for the second PUSCH of the set of PUSCHs indicates a different SRS resource than the first SRS resource, and wherein the second PUSCH is transmitted based on the first SRS resource.

20. The apparatus of claim 18, wherein the first PUSCH and the second PUSCH do not maintain phase continuity in response to the first PUSCH and the second PUSCH being transmitted based on a first SRI of 0 and a second SRI of 0.

21. The apparatus of claim 18, wherein the at least one processor is further configured to:

transmit, to the base station, the first and second SRS resources at a single transmit occasion.

22. The apparatus of claim 18, wherein the at least one processor is further configured to:

receive, from the base station, for each PUSCH of the set of PUSCHs, a transmission rank indicator (TRI) and a transmit precoder matrix indicator (TPMI), wherein each PUSCH of the set of PUSCHs is transmitted based on its respective TRI and TPMI, wherein each TRI indicates a same rank, and wherein transmit precoder matrices indicated by each TPMI of the TPMIs have a same mapping between antenna port and transmission layer.

23. The apparatus of claim 18, wherein the at least one processor is further configured to receive, from the base station, for each PUSCH of the set of PUSCHs, a transmission rank indicator (TRI) and a transmit precoder matrix indicator (TPMI), wherein:

the TRI for the first PUSCH indicates a first transmission rank, the TPMI for the first PUSCH indicates a first transmit precoder matrix, the TRI for a second PUSCH indicates a second transmission rank different from the first transmission rank or the TPMI for the second PUSCH indicates a second transmit precoder matrix different from the first transmit precoder matrix, and the second PUSCH is transmitted based on the first transmission rank and the first transmit precoder matrix.

24. The apparatus of claim 18, wherein the at least one processor is further configured to:

receive, from the base station, a SRI for a third PUSCH from the base station, the SRI for the third PUSCH indicating a different SRS resource than the first SRS resource, wherein the set of PUSCHs does not comprise the third PUSCH, and wherein the indication is to transmit the third PUSCH and the set of PUSCHs with comprising each of the corresponding DMRS; and transmit, to the base station, the third PUSCH based on the different SRS resource, wherein a DMRS of the third PUSCH is not included in the DMRSs of PUSCHs in the set of PUSCHs.

25. An apparatus for wireless communication at a base station comprising:

a memory; and at least one processor coupled to the memory and configured to:

transmit, to a user equipment (UE), an indication to transmit a set of physical uplink shared channels (PUSCHs), each PUSCH of the set PUSCHs comprising a corresponding demodulation reference signal (DMRS);

transmit, to the UE, for a first PUSCH of the set of PUSCHs, a first sounding reference signal (SRS) resource indicator (SRI) and for a second PUSCH of the set of PUSCHs, a second SRI; and receive, from the UE, the first PUSCH and the second PUSCH of the set of PUSCHs comprising the corresponding DMRS, wherein the first PUSCH and the second PUSCH maintain phase continuity responsive to the first SRI being equal to the second SRI.

26. The apparatus of claim 25, wherein the SRI for the second PUSCH of the set of PUSCHs indicates a different SRS resource than the first SRS resource, and wherein the second PUSCH is transmitted based on the first SRS resource.

27. The apparatus of claim 25, wherein the first PUSCH and the second PUSCH do not maintain phase continuity in response to the first PUSCH and the second PUSCH being transmitted based on a first SRI of 0 and a second SRI of 0.

28. The apparatus of claim 25, wherein the at least one processor is further configured to receive, from the UE, the first and second SRS resources at a single transmit occasion.

29. The apparatus of claim 25, wherein the at least one processor is further configured to transmit, to the UE, for each PUSCH of the set of PUSCHs, a transmission rank indicator (TRI) and a transmit precoder matrix indicator (TPMI), wherein:

the TRI for the first PUSCH indicates a first transmission rank, the TPMI for the first PUSCH indicates a first transmit precoder matrix, the TRI for a second PUSCH indicates a second transmission rank different from the first transmission rank or the TPMI for the second PUSCH indicates a second transmit precoder matrix different from the first transmit precoder matrix, and the second PUSCH is received based on the first transmission rank and the first transmit precoder matrix.

30. The apparatus of claim 27, wherein the at least one processor is further configured to:

transmit, to the UE, a SRI for a third PUSCH, the SRI for the third PUSCH indicating a different SRS resource than the first SRS resource, wherein the set of PUSCHs does not comprise the third PUSCH, and wherein the indication is to transmit the third PUSCH and the set of PUSCHs, each comprising the corresponding DMRS;

receive, from the UE, the third PUSCH based on the different SRS resource, wherein a DMRS of the third PUSCH is not included in the DMRSs of PUSCHs in the set of PUSCHs; and perform a channel estimation for the third PUSCH based on the DMRS of the third PUSCH.

* * * * *